Figure 1:
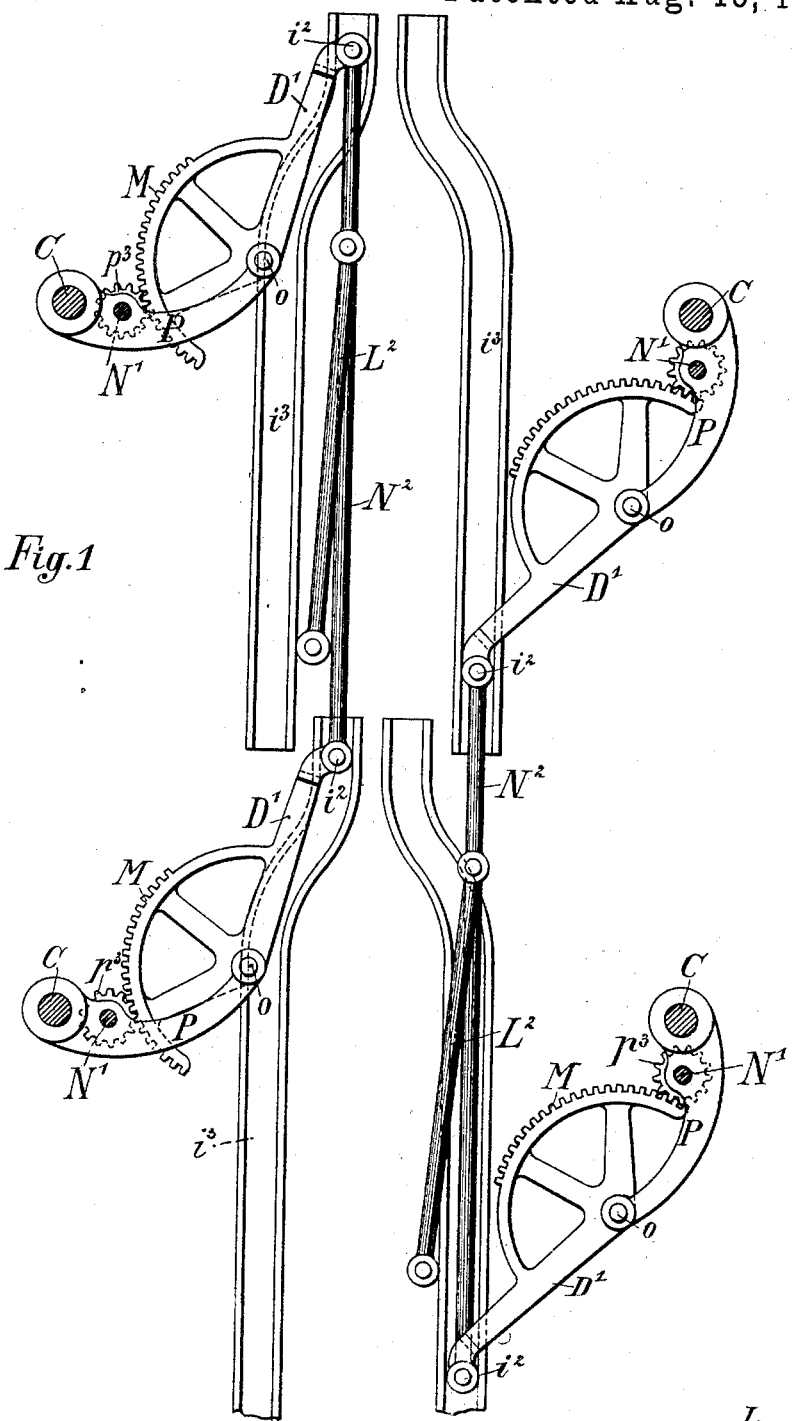
Figure 2:
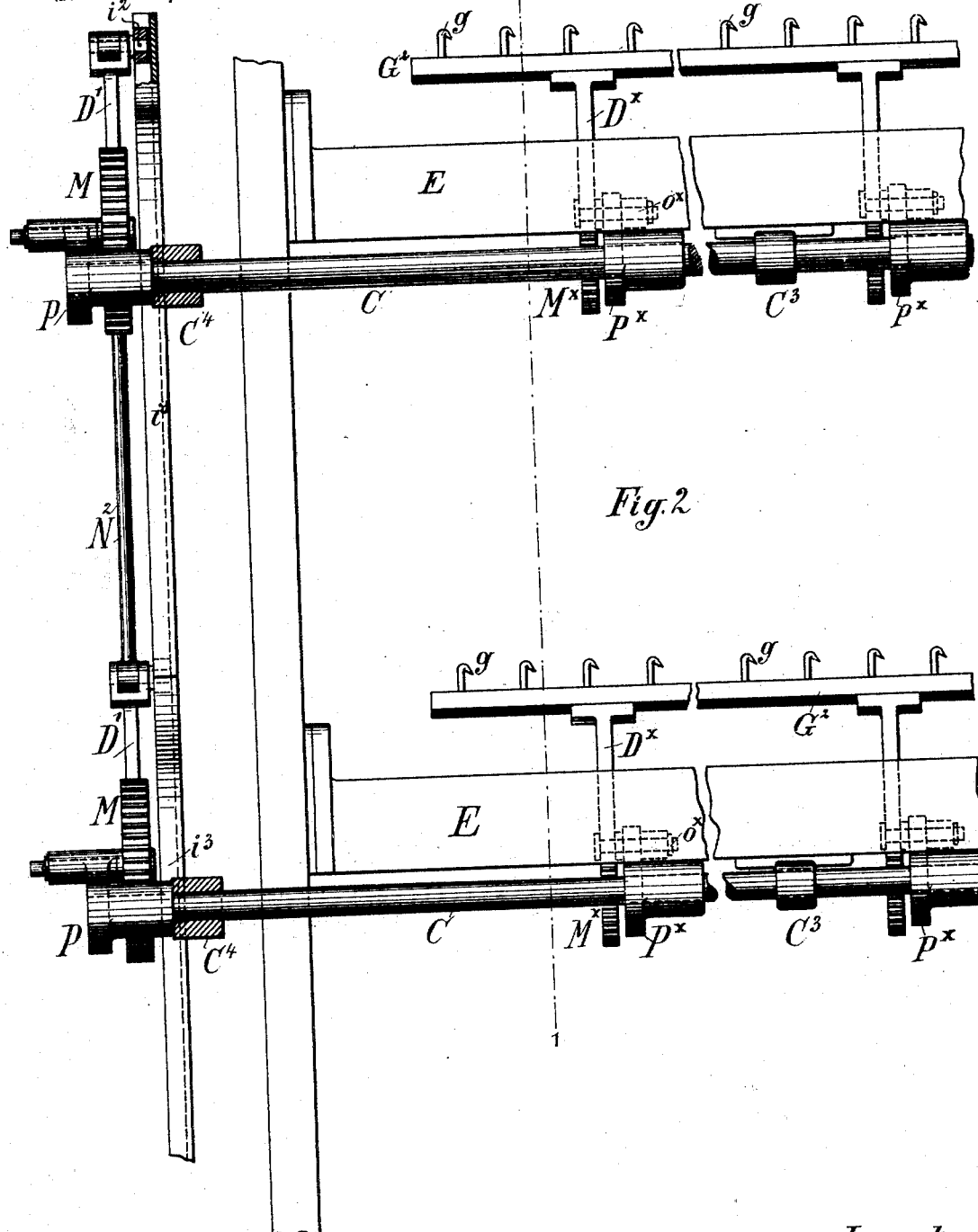

(No Model.)  
E. BUSS & A. SAURER.  
EMBROIDERING MACHINE.  
No. 503,309. Patented Aug. 15, 1893.  
21 Sheets—Sheet 1.

Witnesses:
George Baumann
John Revell

Inventors
Edward Buss and
Adolph Saurer
By their Attys.
Howson and Howson (No Model.)  21 Sheets—Sheet 5.

E. BUSS & A. SAURER.
EMBROIDERING MACHINE.

No. 503,309.  Patented Aug. 15, 1893.

Witnesses:
George Baumann
John Revell

Inventors
Edward Buss and Adolph Saurer
By their Attys
Howson and Howson

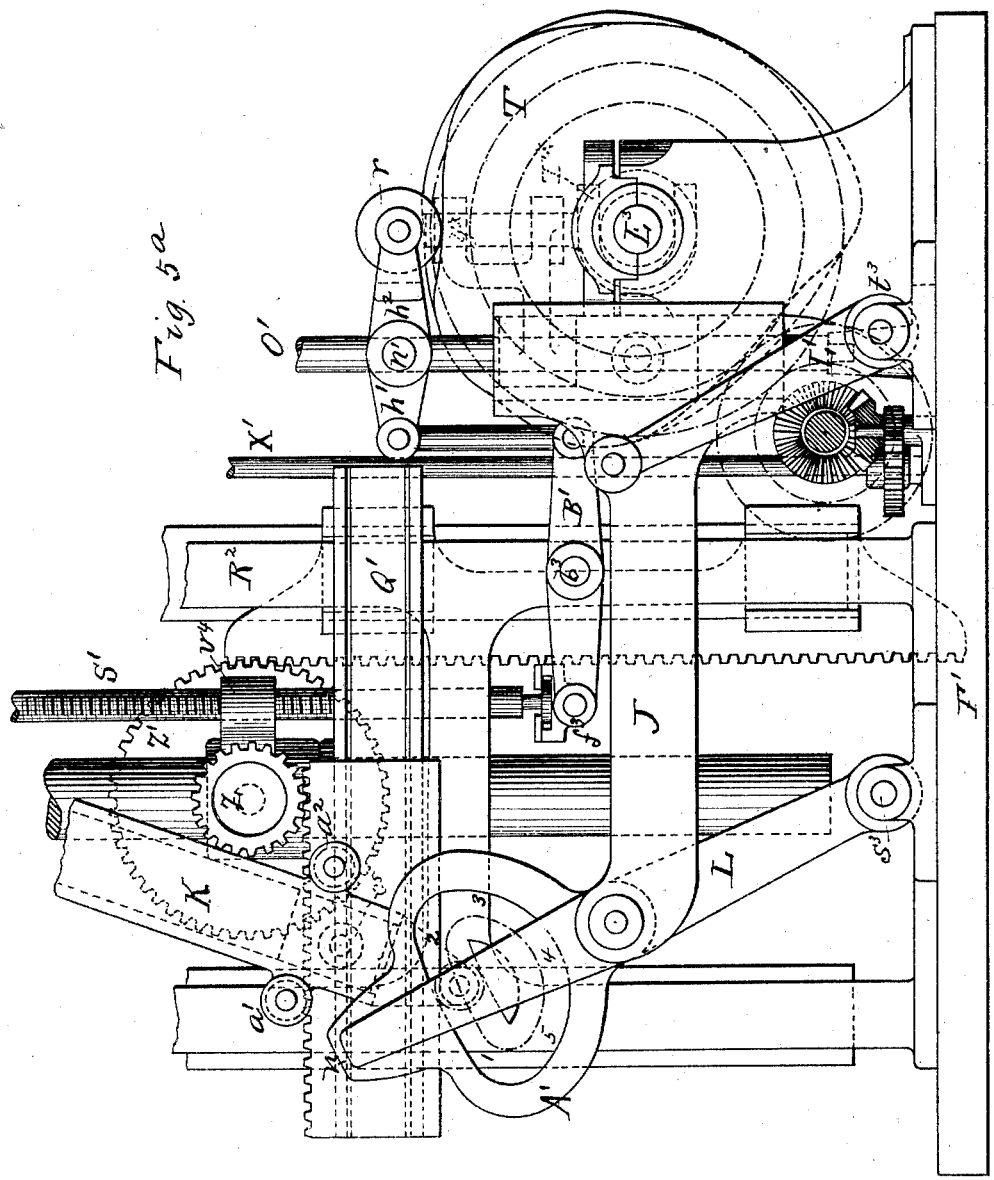

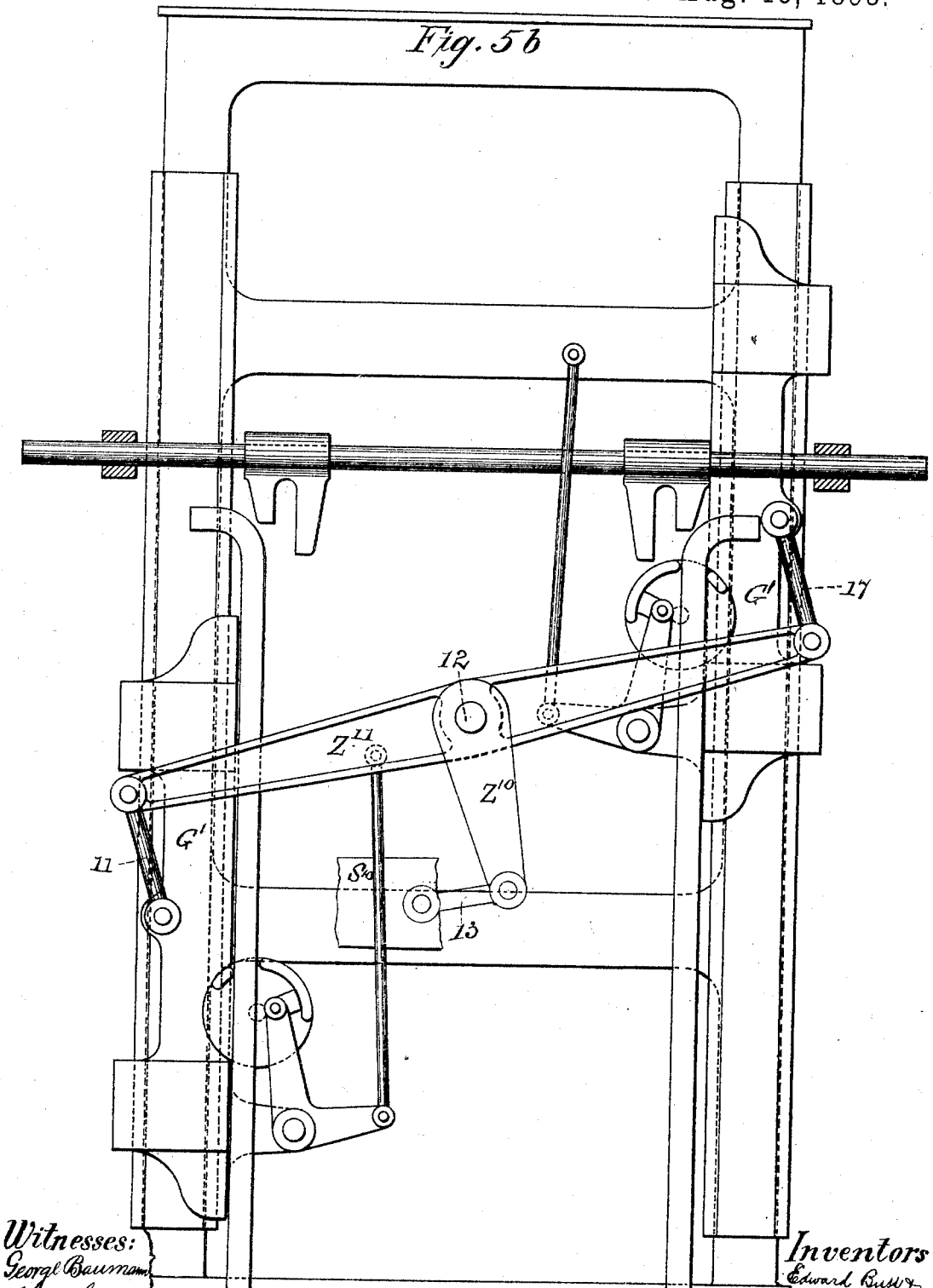

(No Model.)

E. BUSS & A. SAURER.
EMBROIDERING MACHINE.

No. 503,309. Patented Aug. 15, 1893.

Witnesses:
George Baumann
John Revell

Inventors
Edward Buss and Adolph Saurer
By their Attys
Howson and Howson (No Model.)
E. BUSS & A. SAURER.
EMBROIDERING MACHINE.
No. 503,309. Patented Aug. 15, 1893.
21 Sheets—Sheet 9.
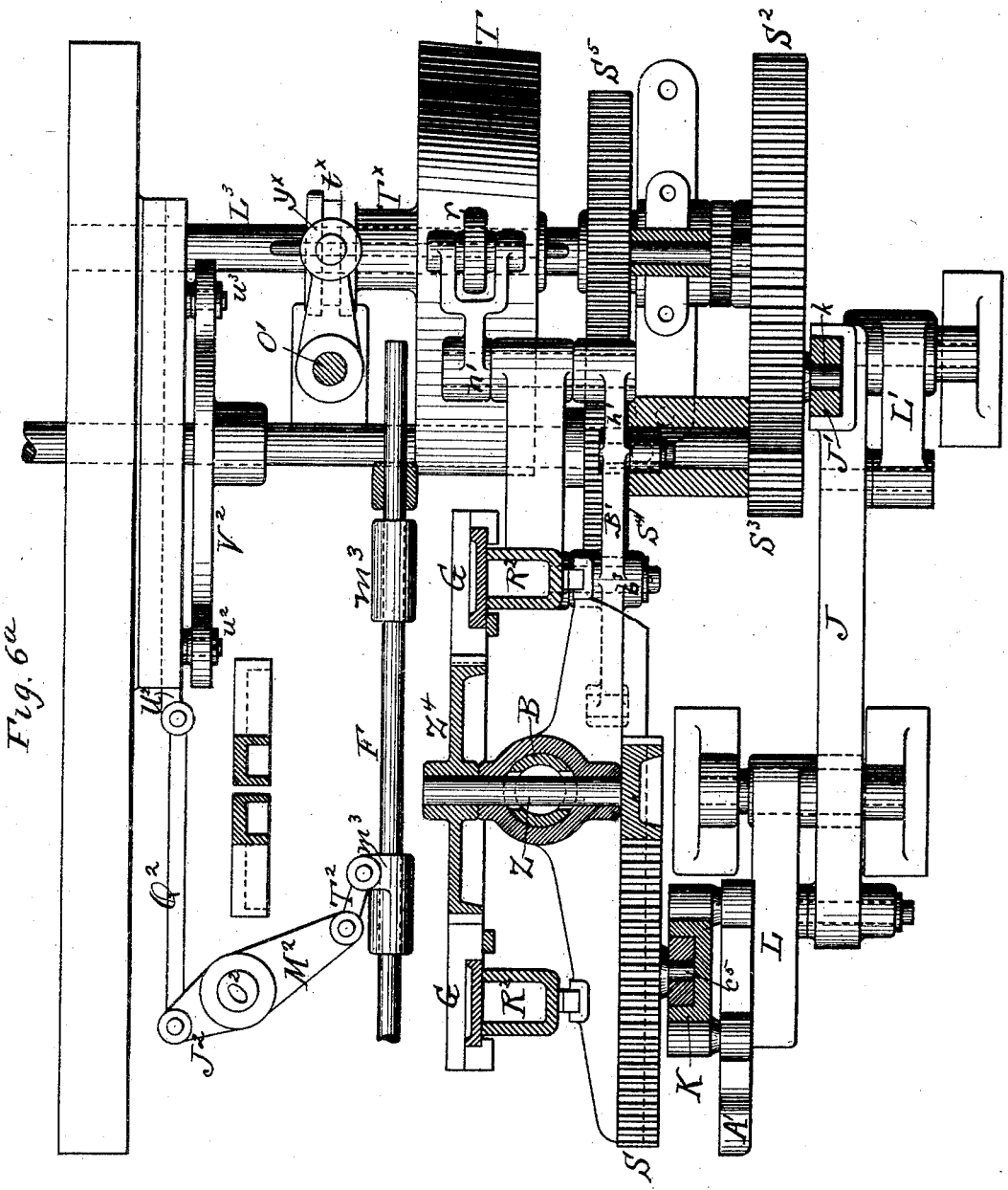
Witnesses:
James Gracie
S. C. Connor
Inventors
Edward Buss and Adolph Saurer
By their Attorneys
Howson and Howson (No Model.) 21 Sheets—Sheet 10.
E. BUSS & A. SAURER.
EMBROIDERING MACHINE.
No. 503,309. Patented Aug. 15, 1893.
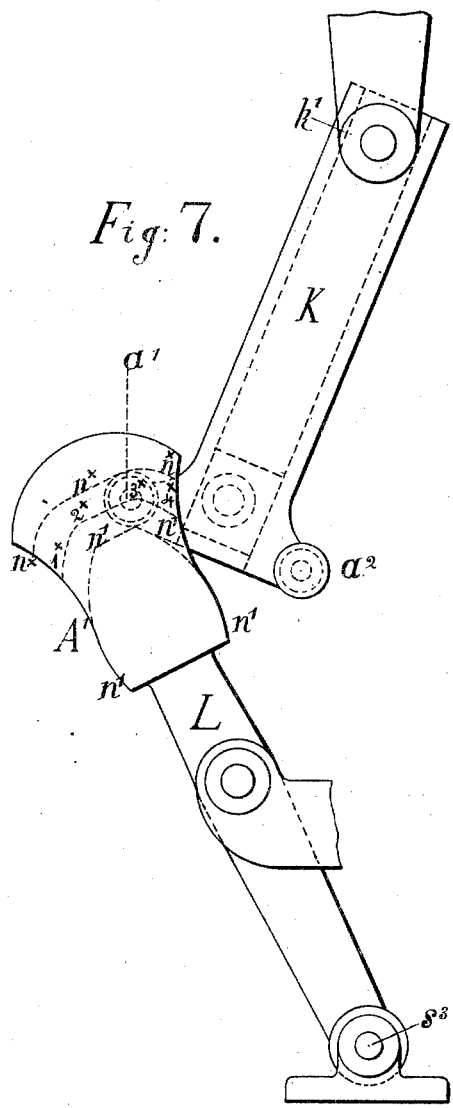
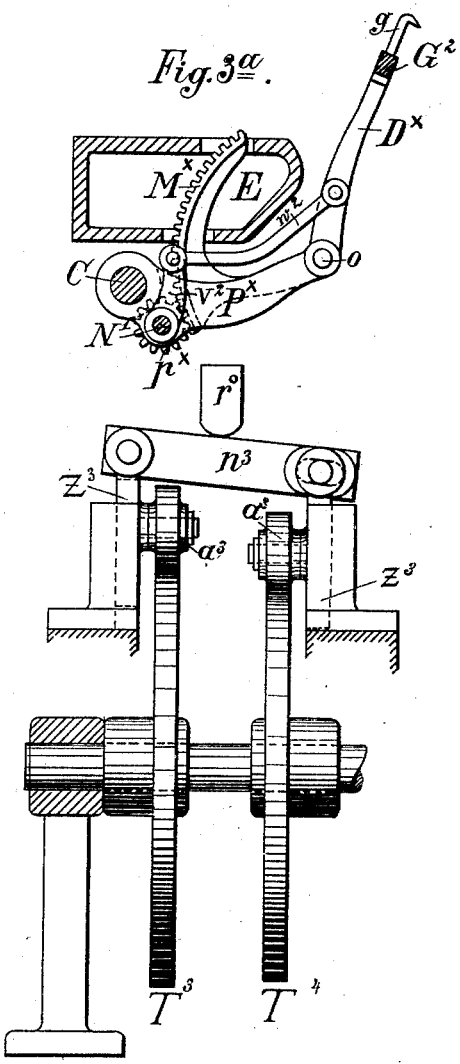
Witnesses:
George Baumann
John Revell
Inventors,
Edward Buss
Adolph Saurer
By their Attys.
Howson and Howson

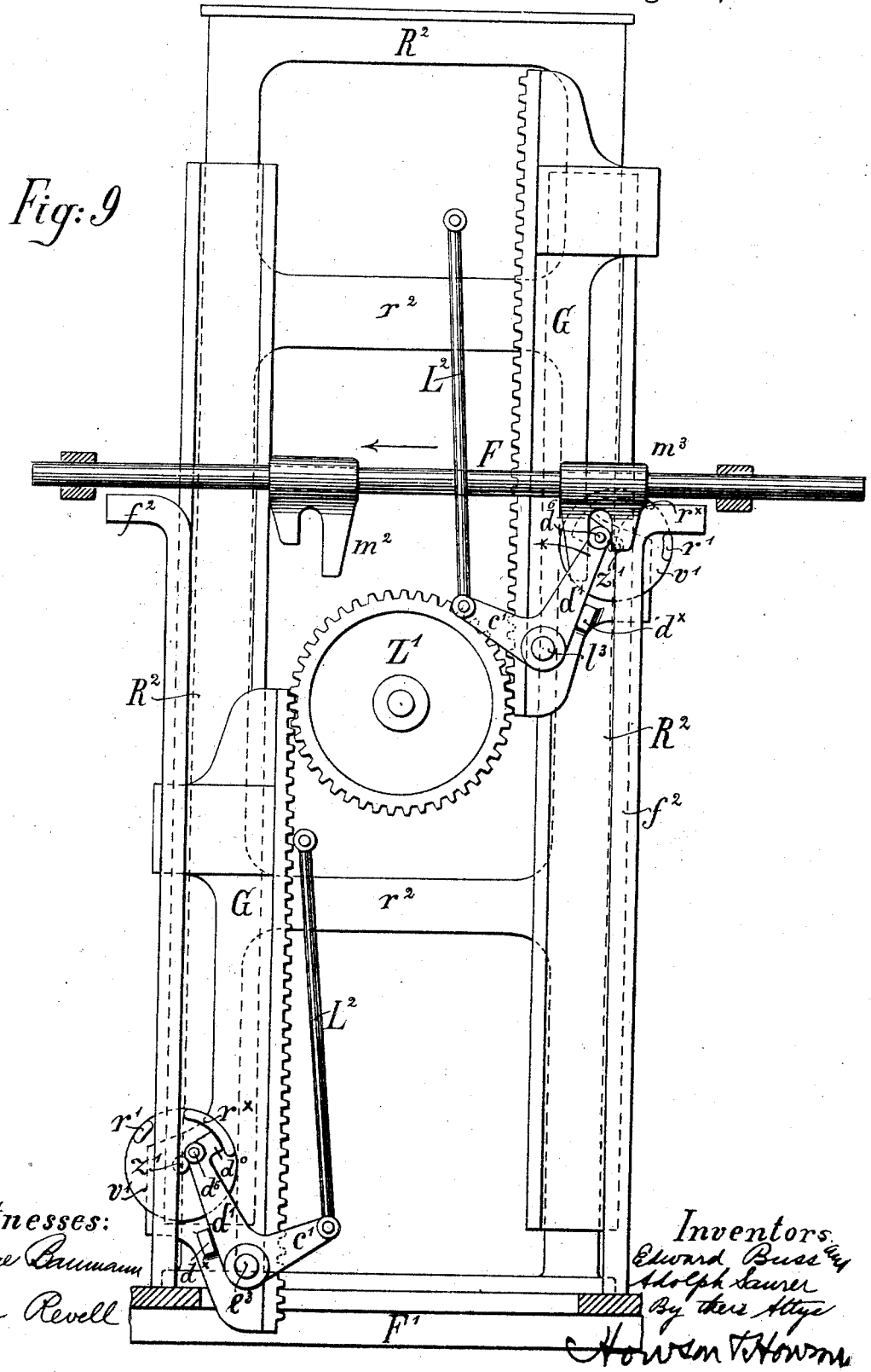

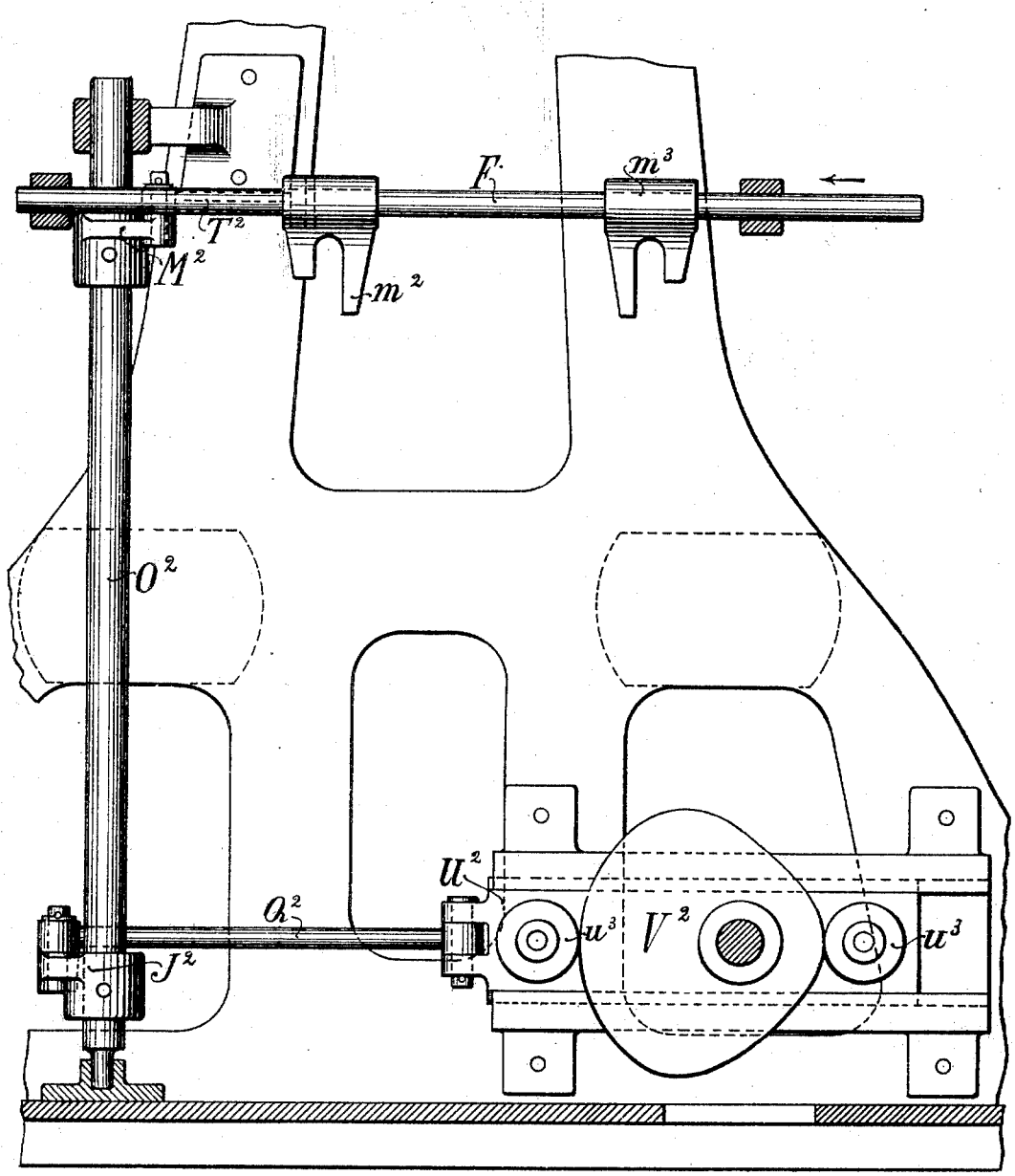

(No Model.)

E. BUSS & A. SAURER.
EMBROIDERING MACHINE.

No. 503,309. Patented Aug. 15, 1893.

Witnesses:
George Baumann
John Revell

Inventors
Edward Buss & Adolph Saurer
By their Attys.
Howsen and Howsen (No Model.)  E. BUSS & A. SAURER.  21 Sheets—Sheet 14.
EMBROIDERING MACHINE.
No. 503,309.  Patented Aug. 15, 1893.
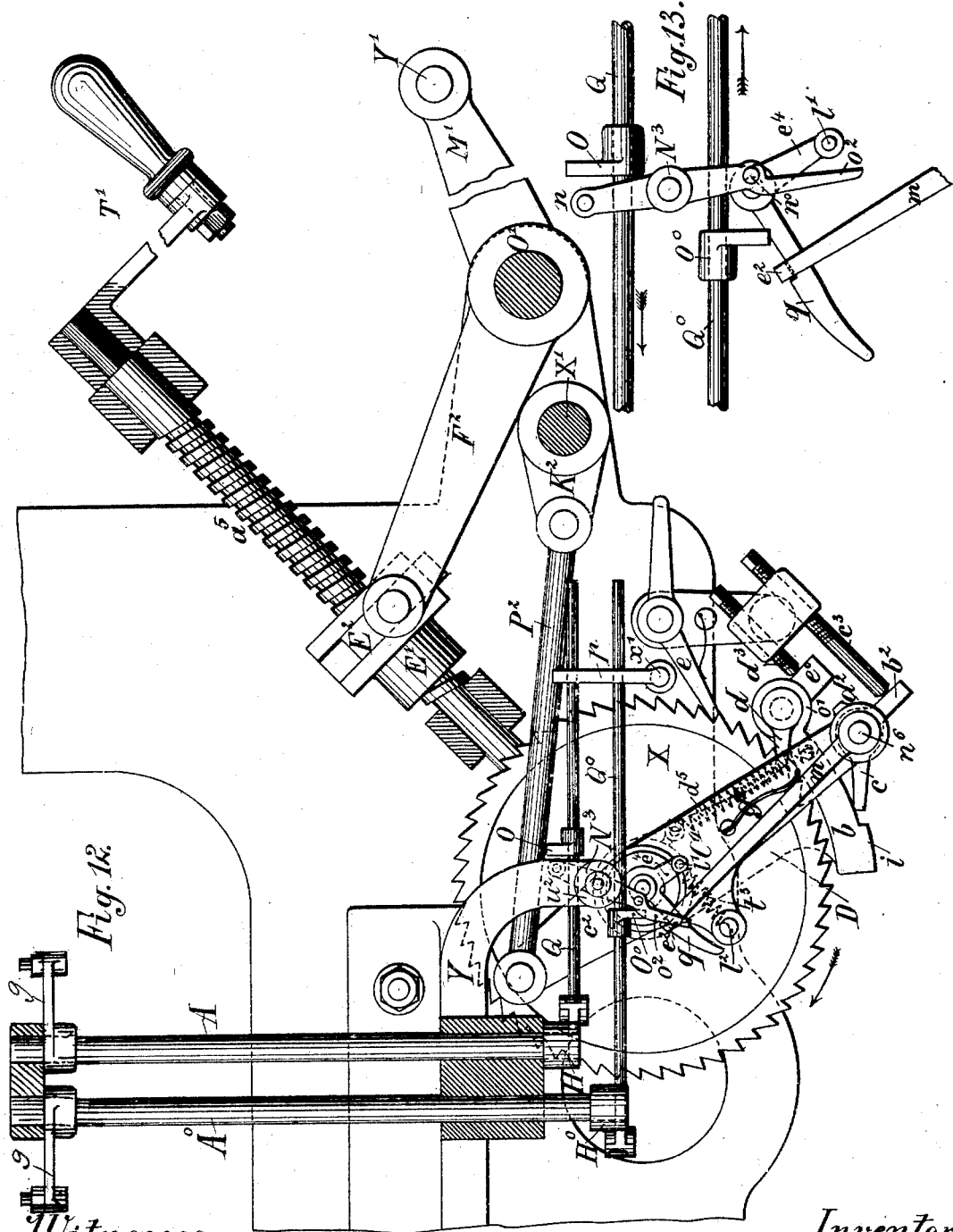
Witnesses:
George Baumann
John Revell
Inventors
Edward Buss and Adolph Saurer
By their Attys.
Howson and Howson (No Model.) 21 Sheets—Sheet 15.
E. BUSS & A. SAURER.
EMBROIDERING MACHINE.

No. 503,309. Patented Aug. 15, 1893.

Witnesses:
George Baumann
John Revell

Inventors,
Edward Buss and Adolph Saurer
By their Atty.
Howson and Howson (No Model.)
E. BUSS & A. SAURER.
EMBROIDERING MACHINE.
No. 503,309.
Patented Aug. 15, 1893.
21 Sheets—Sheet 16.
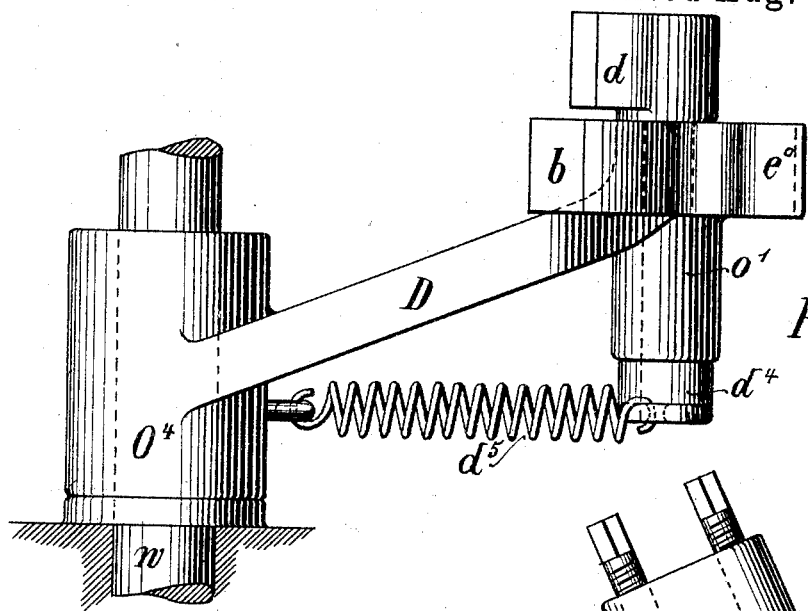
Fig. 16.
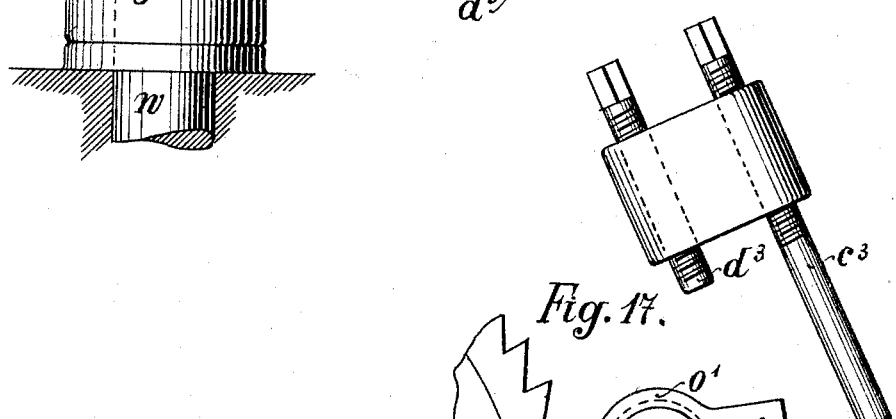
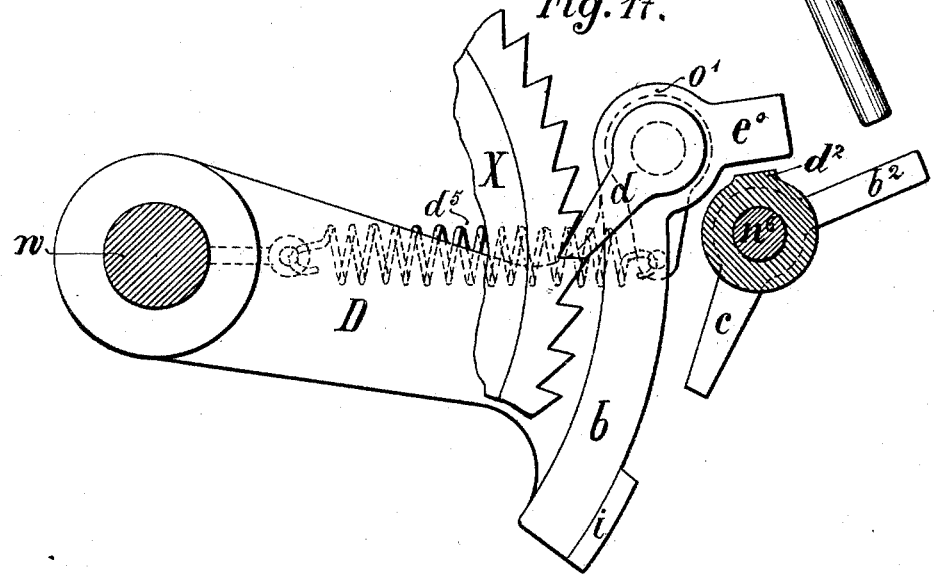
Fig. 17.
Witnesses:
George Baumann
John Revell
Inventors,
Edward Buss and
Adolph Saurer
By their Attys
Howson and Howson

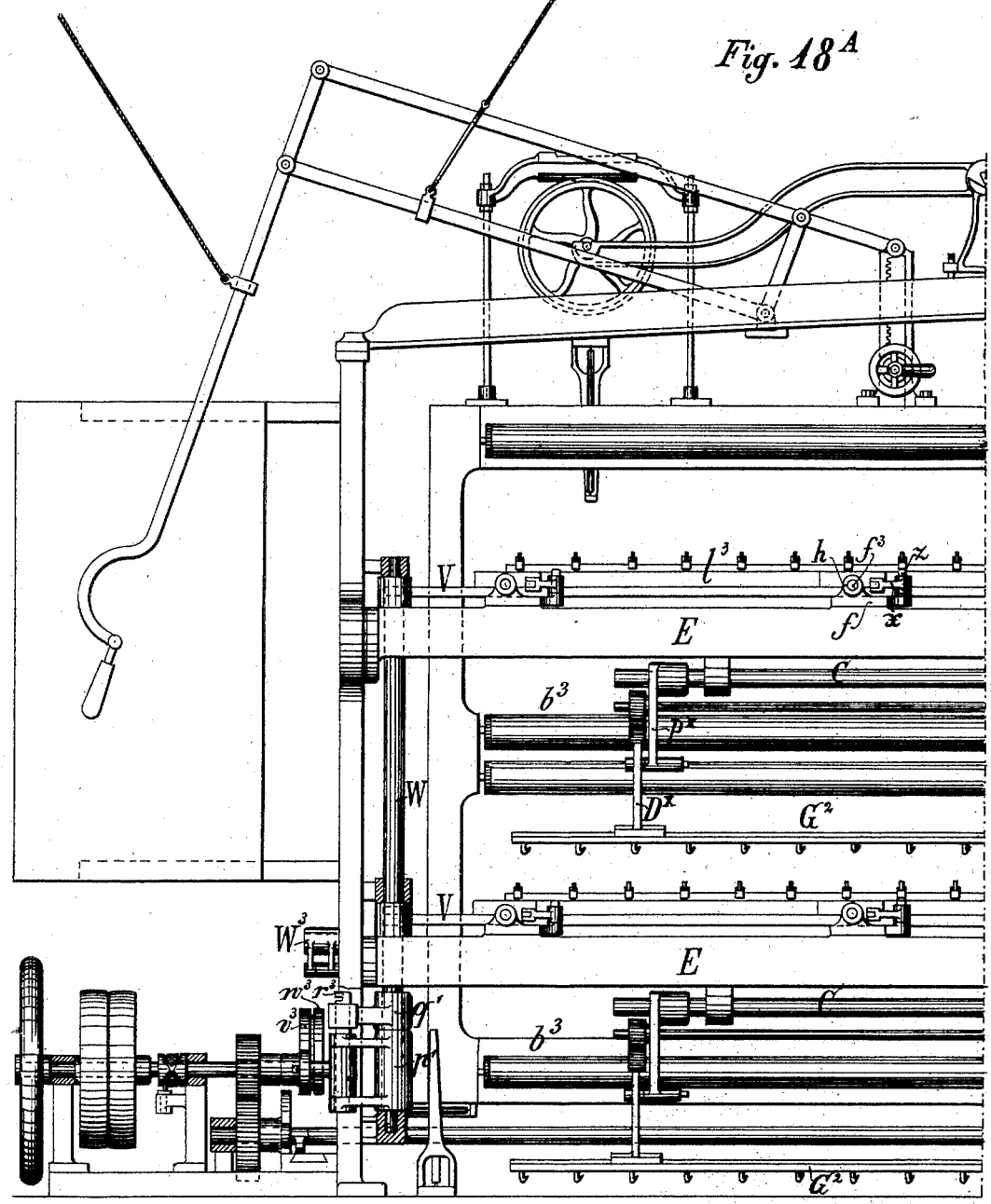

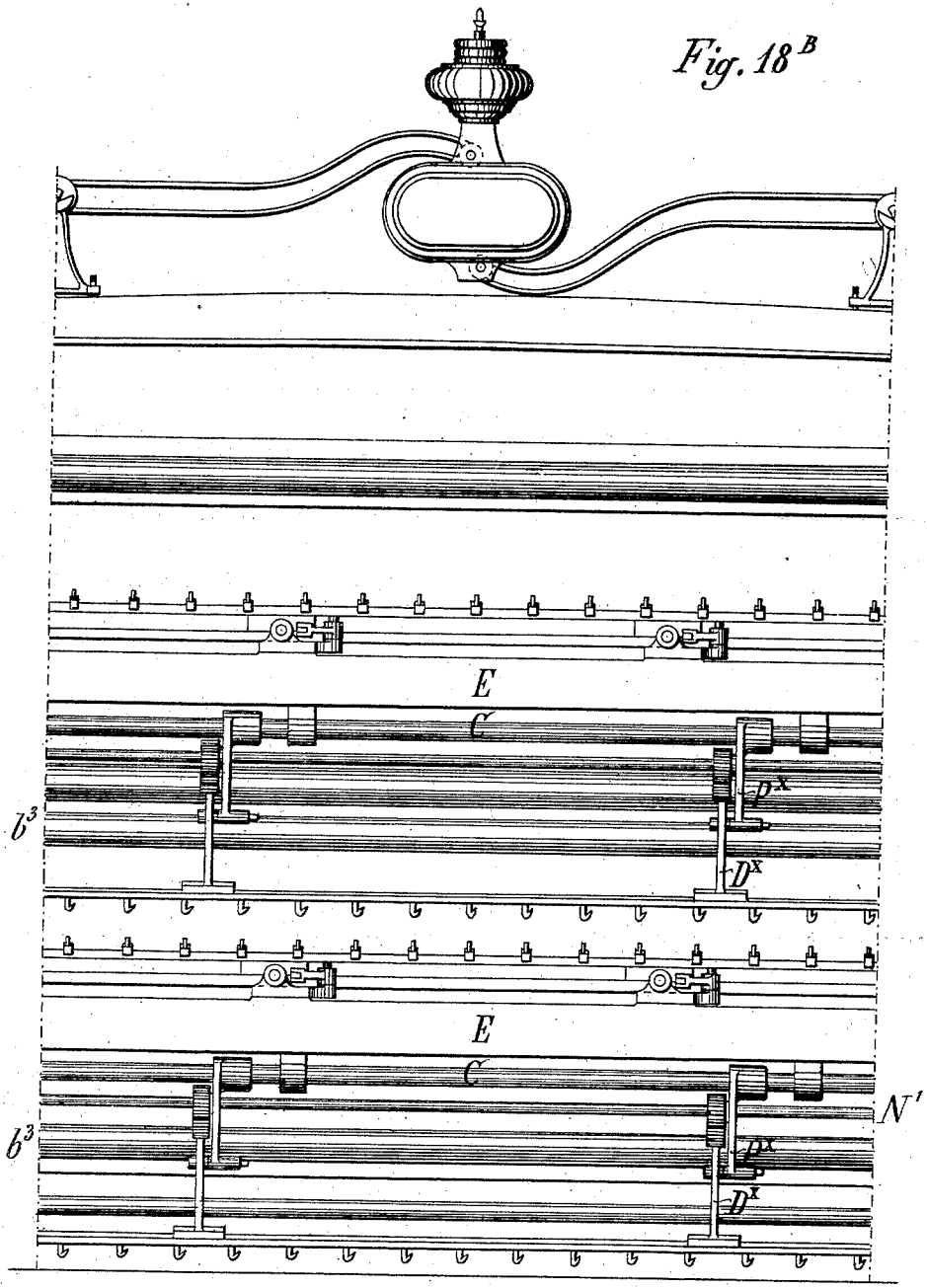

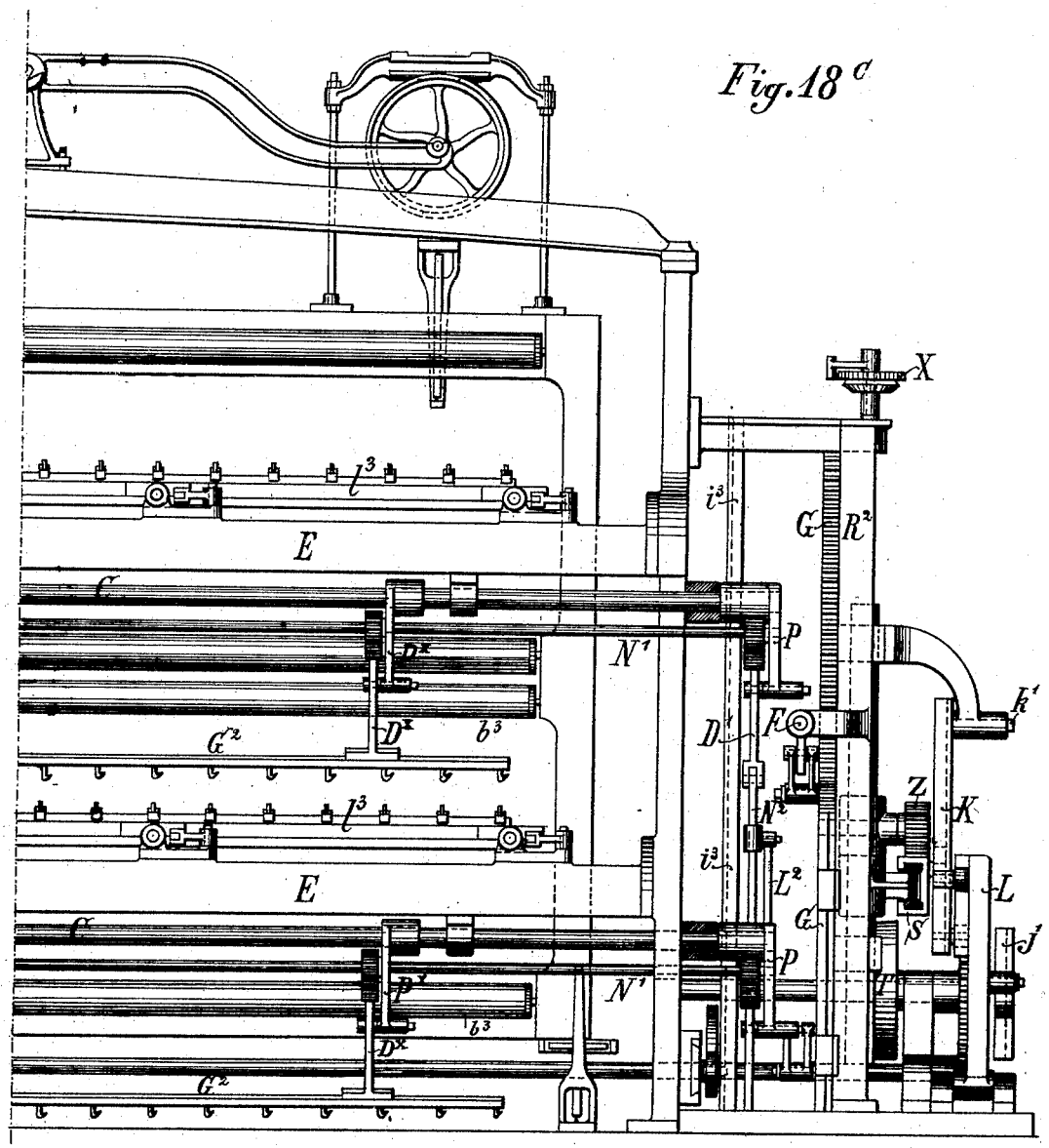

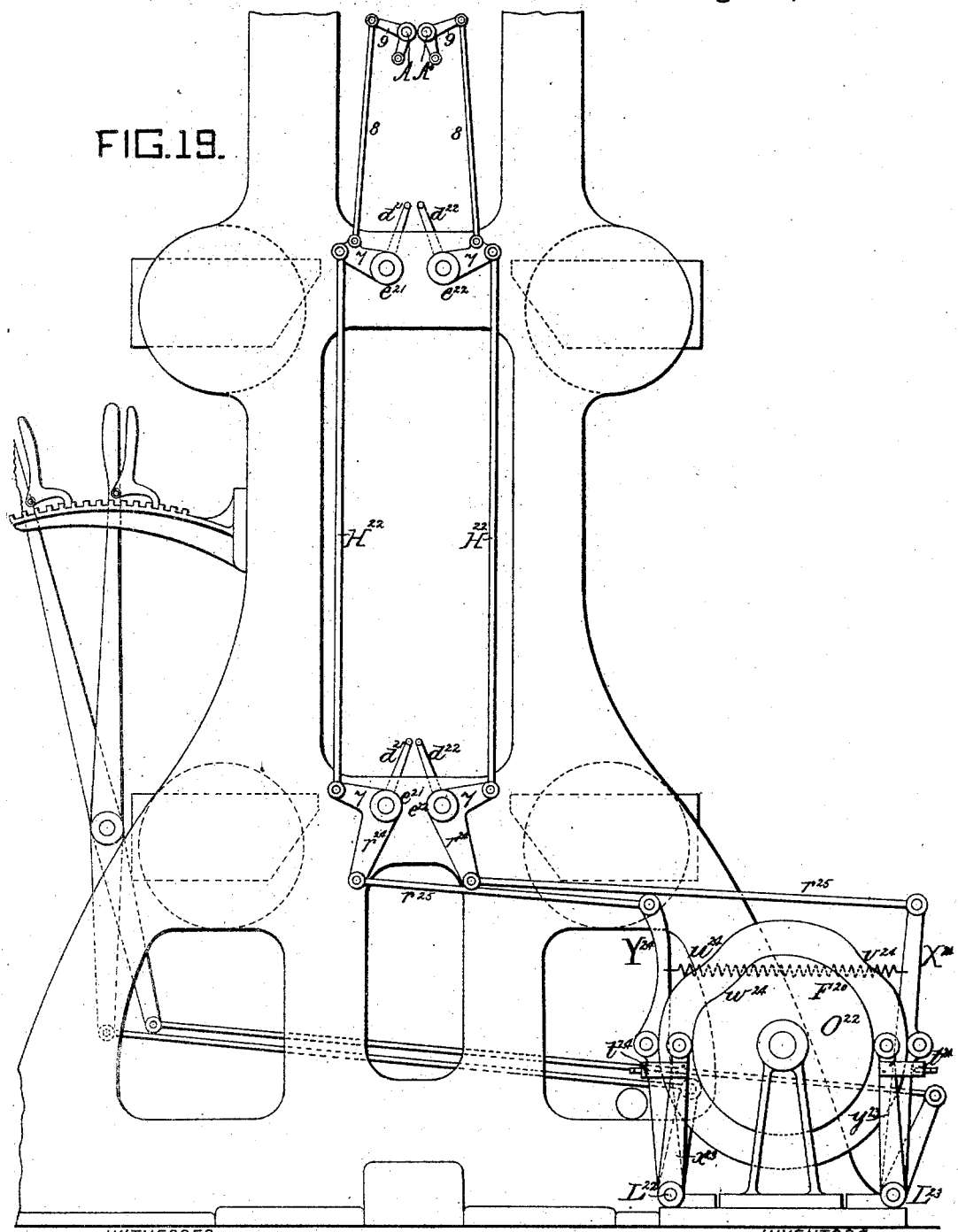

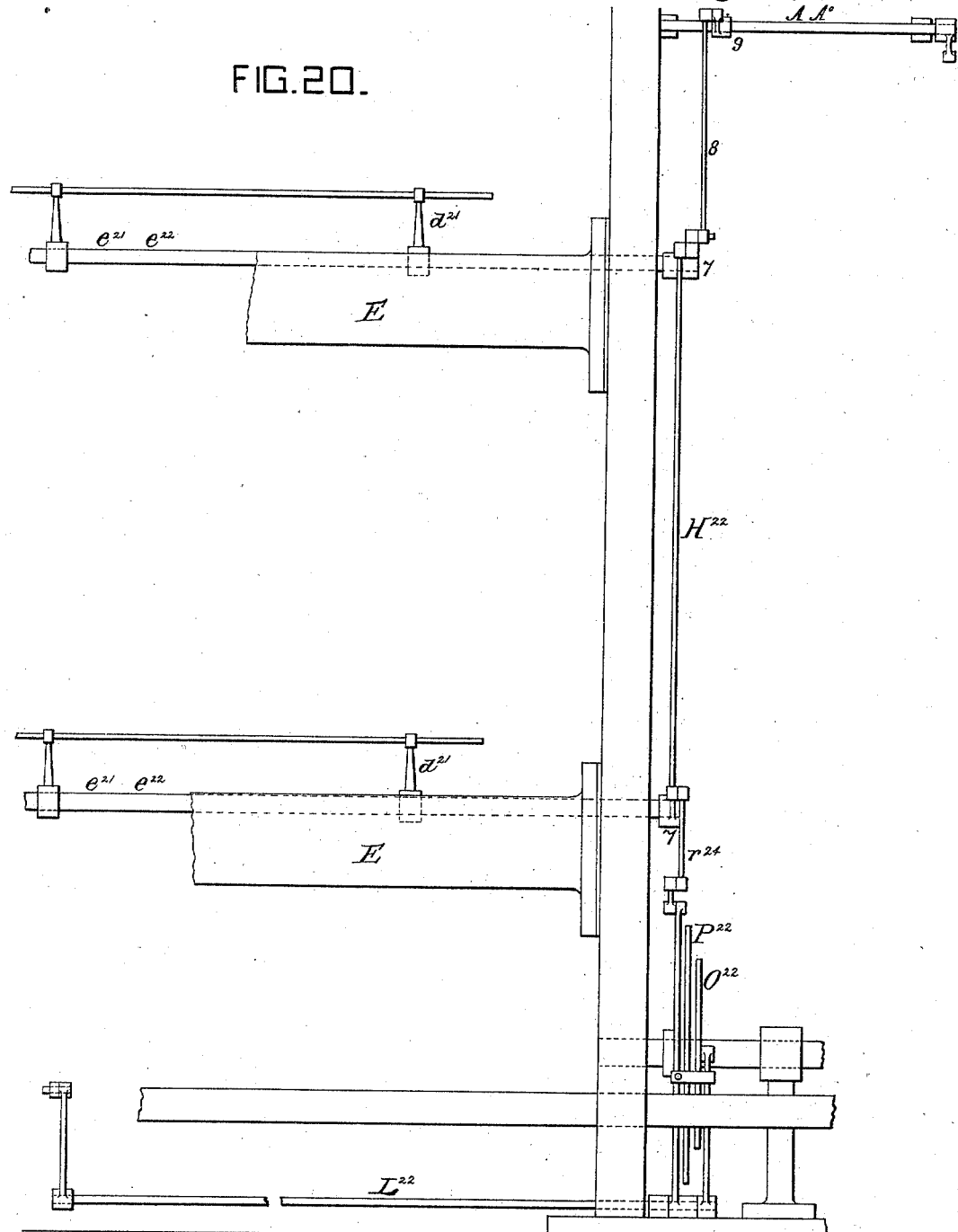

United States Patent Office.

EDWARD BUSS, OF ST. GALL, AND ADOLPH SAURER, OF ARBON, SWITZERLAND.

EMBROIDERING-MACHINE.

SPECIFICATION forming part of Letters Patent No. 503,309, dated August 15, 1893.

Application filed November 24, 1891. Serial No. 412,997. (No model.) Patented in England November 5, 1889, No. 17,583, and in Germany September 17, 1890, No. 57,317.

*To all whom it may concern:*

Be it known that we, EDWARD BUSS, engineer, residing at St. Gall, and ADOLPH SAURER, engineer, residing at Arbon, Switzerland, citizens of the Republic of Switzerland, have invented certain Improvements in Embroidering-Machines, (for which we have obtained Letters Patent in Great Britain, No. 17,583, dated November 5, 1889, and in Germany, No. 57,317, dated September 17, 1890,) of which the following is a specification.

The present invention has for its object a new and improved form of construction in the widest sense of the term for embroidery machines of the type of Swiss or Heilmann machine shown and described in Letters Patent No. 443,820, dated December 30, 1890, and which is hereinafter referred to as the "original machine."

The present invention provides in common with the said machine for an increased productive power when compared with the means formerly employed and further presents, when compared with the said original machine, certain special advantages such as a quieter and lighter running simplification of the general arrangement and in particular a more accurate performance of the work in embroidering difficult or intricate patterns or designs.

The main points of resemblance between the two machines now in question consist essentially in the fact that a combined or concerted action of the parts directly operating to form the embroidery as described with reference to Figure 9 of the said former specification is provided for in both machines and that in consequence thereof in addition to the embroidering devices and the main outline of the frame, certain of the means employed for producing the peculiar movements hereinafter described of the said devices are constructed on the same general principles in both machines. The double-ended needles with central eyes carrying the threads are passed alternately in opposite directions through the web of the fabric on which the embroidery is to be produced by means of two series of reciprocating needle holders or clamps. The clamps of one series first push the needles half way through the web. The clamps of the other series then lay hold of the needles and when they have been released by the first series pull them completely through the web and carry them to a short distance from its surface on the other side. At the same time a series of catchers, which may be in the form of hooks for example, engaging with the threads on the same side of the web as the first series of clamps ascends so as to enable the threads to be drawn through the web by the action of the catchers of the second series on the other side of the web which descend at the same time and draw the threads completely through to the other side of the web. The movements which the catchers have to make at each stitch as the work proceeds are composed of a motion hereinafter termed the "long movement" that is to say the movement from one end of the stroke to the other and certain supplementary movements hereinafter described. These supplementary movements consist first in a movement hereinafter termed the "clearing movement" by which the catchers, when at the upper end of the long movement, sink out of the path of the clamps and then rise again so as to engage with the threads and secondly in a movement hereinafter termed the correcting movement by which the catchers further especially when approaching either end of the long movement act in such a manner as to maintain the threads in the proper state of tension. During these movements the catchers are guided by special mechanism so as to move in unison in parallel prescribed paths. Shortly before each inward movement and after each outward movement of the needle holders or clamps the threads are acted upon twice by tension devices or bars (there being one for each series of clamps). The first movement of the tension device draws the stitches tight, and the second movement puts sufficient tension on the threads as to enable the catchers which at this moment are in their highest position on the other side of the web to engage the threads with precision. These tension devices are composed of light rods fixed to oscillating or vibrating arms and are situated immediately below the path of the needles being caused to act upon the threads by spring pressure. As the threads gradually become shorter as the work proceeds and at a rate varying according to the lengths of the stitches the long motion of the catchers requires to be reduced after every stitch to an extent proportioned to the length of thread consumed in making the stitch. This diminution of the length of the threads is measured by the oscillations of the tension devices the amplitude of these oscillations being lessened in proportion to the quantity of thread consumed in the stitch that is to say in proportion to the length of the stitch this length being subject to variations according to the nature of the work. The movements of the needle clamps or holders are composed of the reciprocating motion of the carriages or slides to which they are attached and the opening or unlocking and closing or locking of the jaws of the clamps.

For the purpose of enabling the machine to execute designs presenting intricate and difficult parts with the requisite clearness and precision and obviate distortion of the figures arising from imperfect tension of the threads, it is found by experience that it is indispensable to conform to the two conditions hereinafter specified with much greater strictness than was actually the case in the original machine. This condition is that the threads must during the period in which they are carried forward or drawn from one side of the web to the other be free from any strain but at the same time must not be allowed to hang too loosely on the catchers. Further, in order to maintain the power required for the working of the machine within moderate limits and obviate unsteady and noisy action it is advantageous to enable those parts of the machine which are called upon to travel for relatively long distances to move without sliding contact or friction or when this is unavoidable to reduce the friction as much as possible. In order to comply with these conditions the following modifications have been introduced in the construction of the original machine: In the first place the means originally employed for guiding the catchers involving the employment of tooth racks sliding in guides with a considerable amount of friction and a heavy and unsteady action of the machine are modified by substituting the friction of a pin or stud in place of the sliding action; secondly the "long movement" of the catchers in place of being transmitted by means of connecting links or rods (necessarily somewhat uneven or irregular in their action) is produced by the aid of a slotted crosshead with a symmetrical or regular motion thus insuring the most favorable conditions for the accurate performance of the "correcting movement" hereinafter described; thirdly, the gradual diminution of the amplitude of the "long movement" of the catchers in accordance with the gradual shortening of the threads is regulated or controlled by an improved arrangement of the mechanism whereby this diminution is made to correspond with the actual consumption of thread being more advantageously connected with the tension device and otherwise improved as hereinafter explained; fourthly, the supplementary movements of the catchers are obtained by means of two independent apparatuses one producing the "clearing movement" by which the catchers at the end of their upward motion are moved out of the path of the needle clamps when the latter move toward the web and another apparatus controlled by a special cam drum or combination of cam disks produces the "correcting movement" which modifies the long movement in such a manner that the threads whether long or short are, during their motion through the web invariably maintained at a uniform and equal degree of very slight tension. With regard to the third condition it is found that in the original machine the automatic shortening of the long movement of the catchers according to the rate of consumption of the thread was not performed with the requisite precision when the force necessary for the tension was required to vary to a considerable extent in the course of the operations. The cause of this is that when the nature of the pattern is such as to require a variable tension of the thread the extent of the throw or stroke of the tension device in measuring the length of thread consumed in the preceding stitch is not exclusively governed by the consumption of thread but is also affected by the stretching or elongation of the thread and by the yielding or bulging of the web, both of which influences augment as the tension on the thread is increased. By means of the new arrangement hereinafter described the difficulty of obviating the disturbing influence resulting from the elongation of the threads and yielding of the web and which is liable to affect the action of the mechanism employed to regulate the rate of reduction or shortening of the long movement is overcome, the machine being now enabled to produce with precision embroidery work of a kind involving great differences in the amounts of thread tension required for tightening successive stitches in the moment these are pulled tight to the web. This improvement is obtained mainly by so arranging the regulating mechanism that it is not influenced by the movement of the tension device which takes place immediately before the needles travel inward but is controlled by the thread acting on the tension device after an outward stroke of the needles when the tension of the said thread is slight and always uniform.

The improvements forming the object of the present invention are hereinafter described in detail with reference to the accompanying drawings.

Fig. 1 represents in elevation, partly in section, the parts situated outside the framing of the machine and receiving motion from the mechanism actuating the catchers. Fig.

Figure 3:
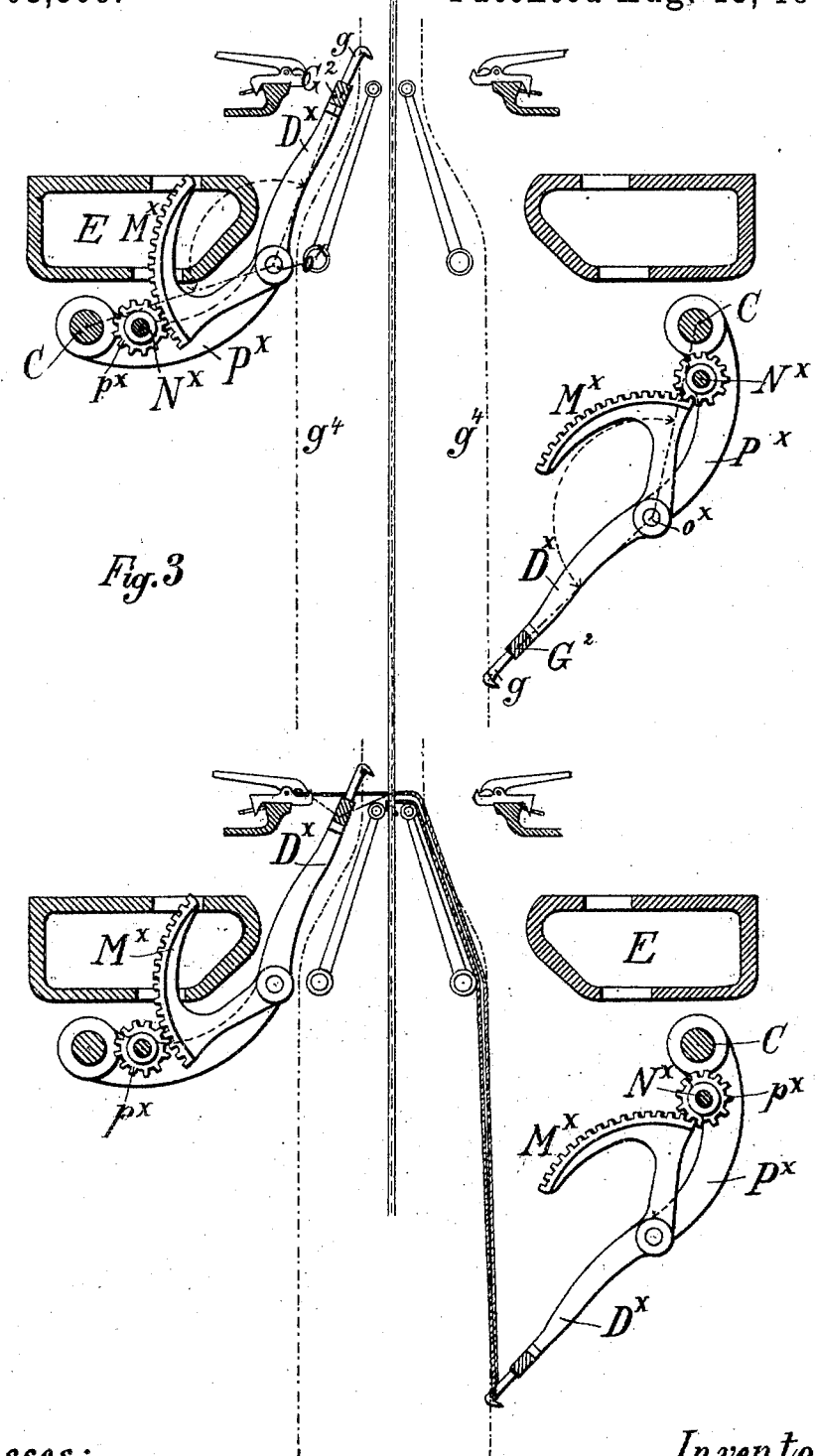
Figure 4:
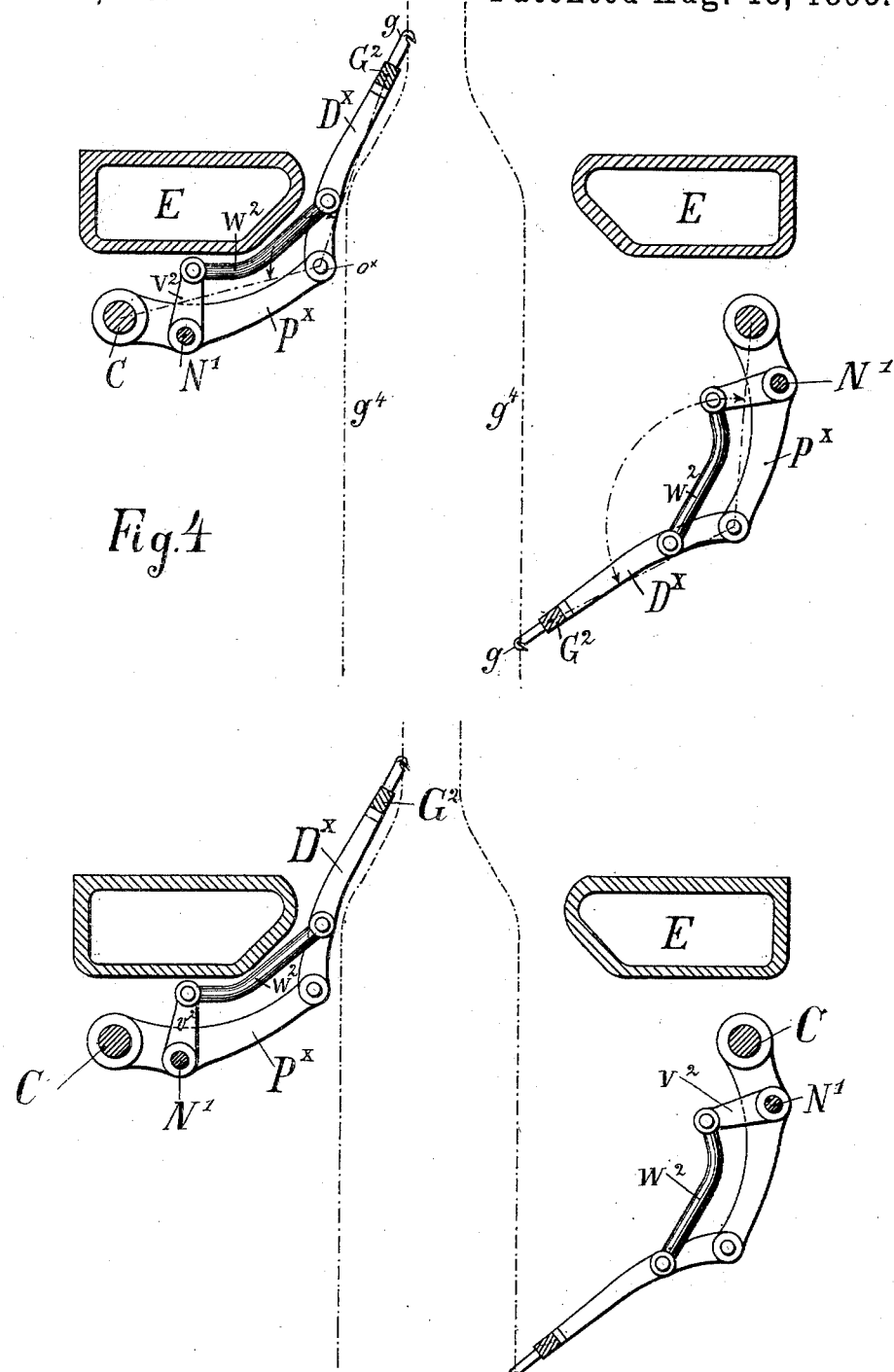
Figure 5:
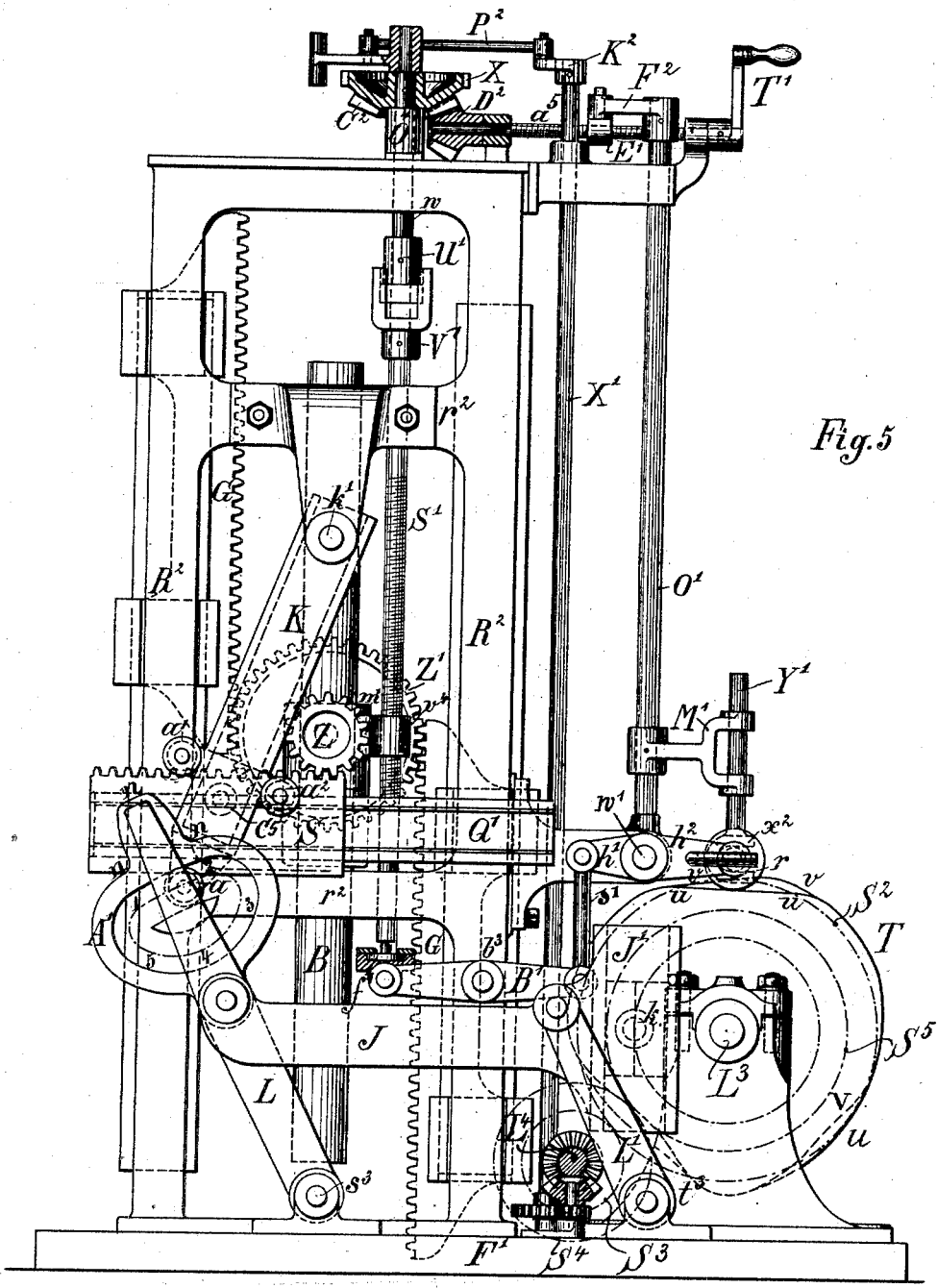
Figure 5D:
Figure 6:
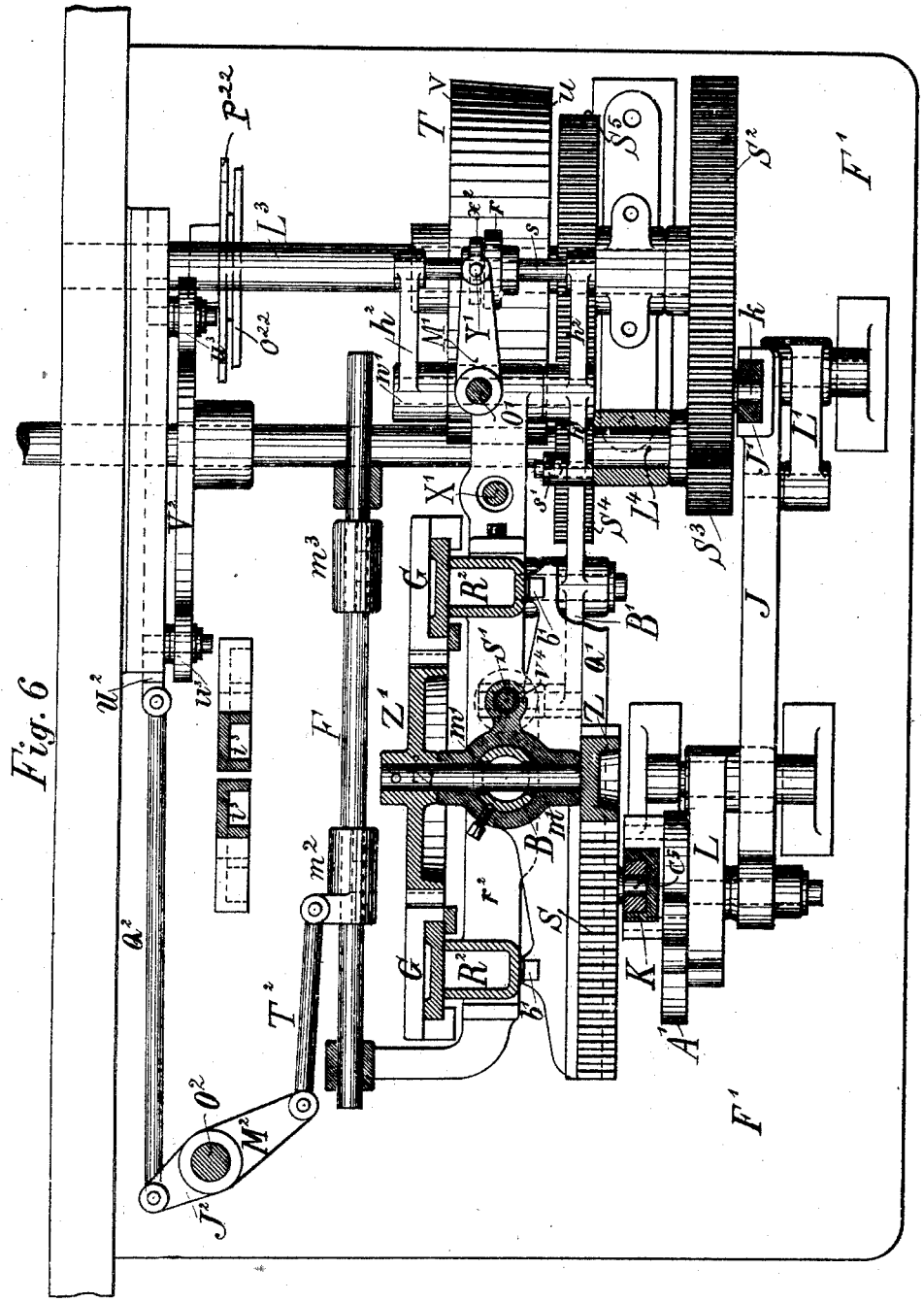
Figure 11:
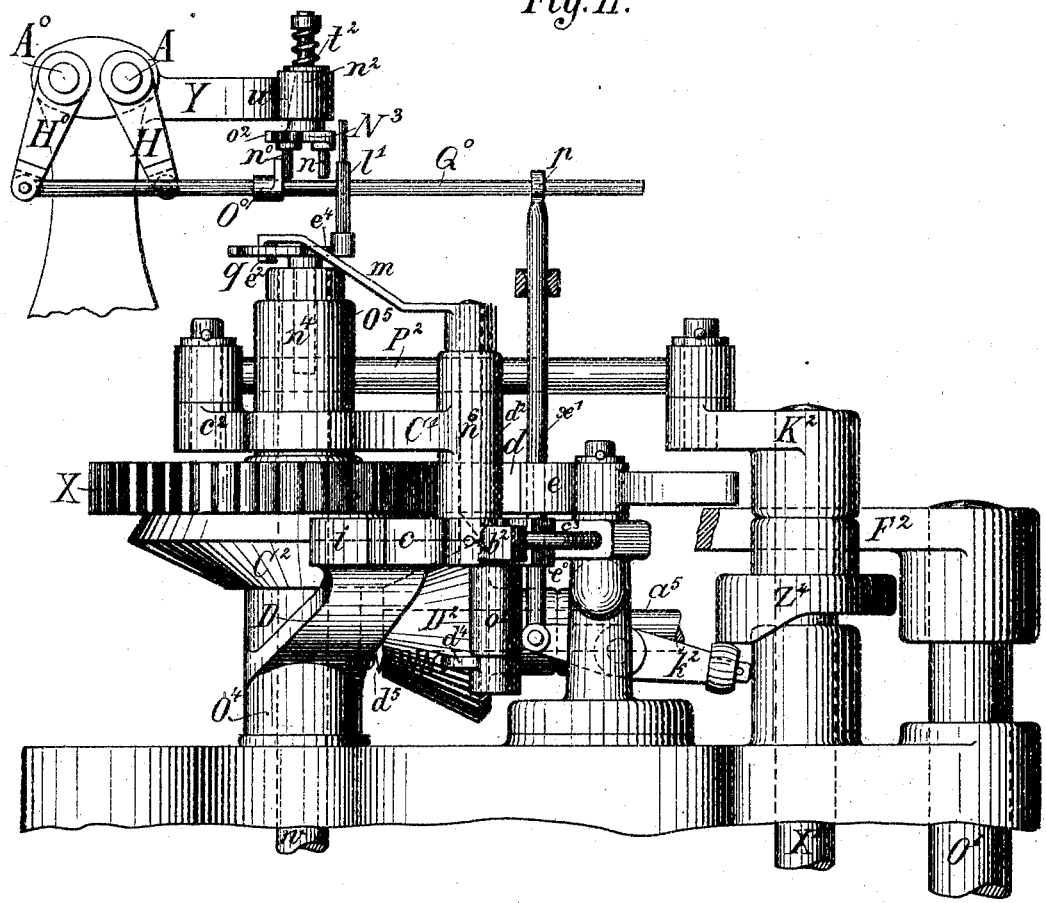
Figure 14:
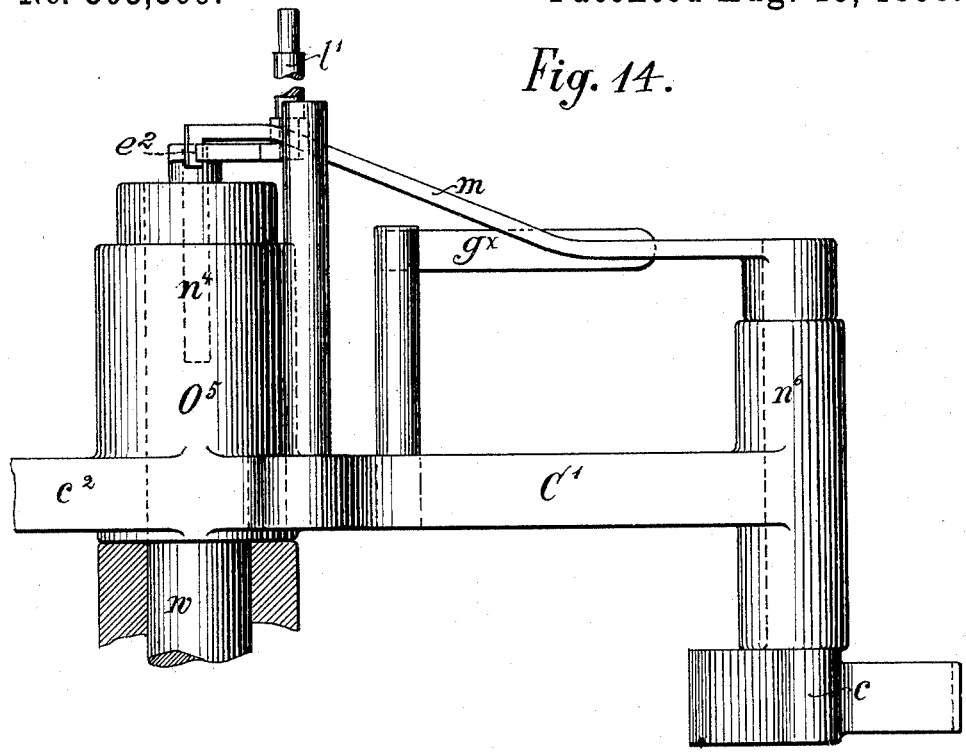
Figure 15:
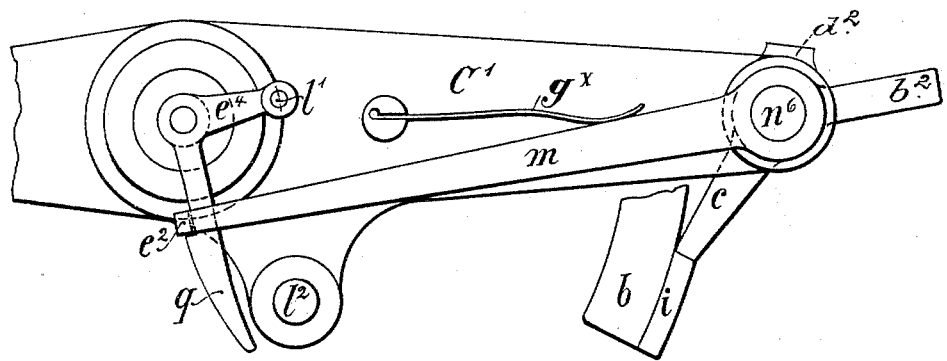

2 represents in plan a portion of the catchers and parts immediately connected therewith. Fig. 3 is an elevation partly in vertical section representing the relative position of the gangs of catchers on opposite sides of the web, the catchers in each gang being caused to move in unison by means of a combination of toothed segments and spur wheels. Fig. 4 is a similar elevation of an arrangement in which a combination of connecting links is employed in place of the said segments and wheels. Fig. 3$^a$ shows a modification of the devices shown in Figs. 3 and 4. Fig. 5 is an elevation, and Fig. 6 is a plan partly in section of mechanism operating in connection with the take-up or thread catchers. Figs. 5$^a$, 5$^b$ and 6$^a$ show modifications of certain parts shown in Figs. 5 and 6. Fig. 5$^d$ is a sectional view of a coupling shown in Fig. 5. Figs. 7 and 8 show modifications of different parts shown in Figs. 5 and 6. Figs. 9 and 10 are views of the mechanism for causing the thread catchers to perform the "clearing movement." Fig. 11 is an elevation, and Fig. 12 a plan, partly in section, of the mechanism for automatically shortening the long movement of the take-up or thread catchers. Figs. 13, 14 and 15, drawn to a larger scale, illustrate details of parts of this regulating apparatus as hereinafter described. Figs. 16 and 17 are similar views illustrating part of the said apparatus. Figs. 18$^a$, 18$^b$, and 18$^c$ illustrate in elevation the right hand end, middle and left hand end respectively of a complete machine constructed according to this invention. Figs. 19 and 20 are views at right angles to each other of mechanism for operating the tension devices.

The mechanism employed to cause all the catchers in each gang to move in unison is represented in Figs. 1 to 4. On the end of a rock shaft C there is fixed an arm P, Figs. 1, 2 and 18$^c$ connected by a link D' to a vertically reciprocating rod N$^2$ by pins $i^2$ working in guides $i^3$. This link is connected to the arm P by a pin $o$ and carries a circular rack or toothed segment M gearing with a spur wheel $p^3$ on a shaft N' working in a bearing carried by the arm P. The shafts C and N' extend from one end of the machine to the other (Figs. 18$^a$, 18$^b$, 18$^c$) and are provided between the side frames with arms P$^\times$ and spur wheels $p^\times$ corresponding to the arm P and wheel $p^3$. To the arms P$^\times$ are pivotally connected by pins $o^\times$ arms D$^\times$ carrying rails or bars G$^2$ to which the catchers are attached. These arms D$^\times$ are connected to circular racks or toothed segments M$^\times$ similar to the segments M and gearing with the spur wheels $p^\times$ which are similar to the wheels $p^3$ so that all the arms D$^\times$ in each gang of catchers are caused to move in unison parallel with one another and with the link D' whose movements are controlled by rollers working in the guides $i^3$. Although the connection between the shaft N' and the levers D' made by the spur-wheels $p^3$ and the toothed segments M is the preferred form, this connection may be effected by means of levers $v^2$ and links $w^2$ as represented in Fig. 4. In either case the injurious sliding action of the racks employed in the original machine is obviated. A parallel or concerted motion of the catchers, such as that hereinbefore described is provided for each bearer E that is to say for each gang of needles.

Figs. 3 and 4 illustrate two different but equivalent mechanical combinations for the inner arms (that is to say the arms are situated between the side frames of the machine) and Fig. 1 illustrates an arrangement of the external arms P and the links D' (that is to say the levers outside the frames) with the shafts C and N' according to which the shaft N' is connected with the lever D' by a pinion and a curved rack or segment being an arrangement corresponding with the arrangement of the inner levers represented in Fig. 3. It does not appear necessary to illustrate by a special drawing the combination of the external mechanism corresponding with the arrangement of internal levers represented in Fig. 4. According to the arrangement illustrated in Fig. 3, the bearers E are cut away to form a passage for the curved racks and the shaft N' works in bearings carried by the levers P.

The mechanism employed according to this invention for obtaining the "long movement" of the catchers is illustrated in elevation in Fig. 5, and in plan partly in horizontal section in Fig. 6. It resembles that employed in the original machine in so far that a vibrating slotted lever K working with a short dwell or period of rest at the end of each oscillation is employed to impart motion to a horizontally sliding rack S by means of a stud or pin C$^5$ on a sliding block working in the slotted lever K. This horizontal rack likewise imparts vertically reciprocating motions in opposite directions through the agency of suitable intermediate devices such as spur wheels Z and Z' to two vertical racks G or their equivalents (such as a combination of levers and connecting rods, see Fig. 5$^b$) the said rack S working in horizontal guides Q', which together with the rack S and spur-wheels Z and Z' are carried by a central support B capable of vertical motion. The amplitude of oscillation of the slotted lever K and the transmission of motion between the horizontal rack and the vertical racks are also so regulated that a vertical displacement of the central support and parts connected therewith changes the length of the stroke of both vertical racks to an equal extent but without altering the position which they occupy at the extreme upper end of their stroke.

According to the improved arrangement illustrated in Figs. 5 and 6 the cylindrical central support B is guided vertically in openings formed in transverse supports $r^2$ being prevented from rotating by adjustable cheeks $b'$ (Fig. 6) attached to the guide Q' and sliding on the front surface of the frame $R^2$. The center of oscillation $k'$ of the slotted lever K (Fig. 5) is arranged at such an elevation that the vertical racks G always remain in gear with spur-wheels $Z'$ without coming in contact with the floor so that the two wheels Z and $Z'$ may suffice for the transmission of motion from the horizontal rack S to the vertical racks G. A sleeve piece $m'$ provided with bearings for the shaft carrying the two spur wheels Z and $Z'$ is slipped over the cylindrical central support and rigidly attached thereto.

The slotted lever K receives motion from a crank pin $k$ through intermediate mechanism which is called upon to comply with the following conditions; in the first place it has to impart to the slotted lever K a vibratory motion upon its center of oscillation with a period of immovability or dwell at the end of each oscillation, the duration of such dwell being capable of being modified or adjusted and in the second place the motion must be transmitted to the slotted lever in such a manner that assuming a vertical line to be drawn through the center of the circular path of the crank pin the slotted lever shall be displaced to an equal extent (symmetrical motion) on each side of its vertical or central position when the crank pin stands at any one of four points situated at equal distances from the said vertical line in the path of the crank pin. The said intermediate mechanism consists preferably of two parallel radius links L and $L'$ pivotally attached to the base plate $F'$, a horizontal connecting rod J provided with a vertically slotted cross head $J'$ engaging with a sliding block connected with the crank pin $k$, a cam head $A'$ on an extension of the radius link L and three rollers $a$, $a'$ and $a^2$ carried by the slotted lever K. The dimensions of the parts are so calculated that the centers of the four hinge pins or pivots connecting the links L and $L'$ with the parallel connecting bar J and with the base plate form the angles of a parallelogram capable of motion upon the fixed centers $s^3$ and $t^3$ and so that when the crank pin is in the two positions coincident with a vertical line drawn through its center of rotation the two radius links L and $L'$ and the slotted lever K shall be all exactly in a vertical position. The three axes of the rollers $a$ $a'$ $a^2$ attached to the slotted lever being parallel to the axis of the latter are preferably so placed or arranged that the axis of the roller $a$ being the farthest from the center of oscillation intersects the center line of the said lever while the two rollers $a'$ $a^2$ situated nearer to the axis of oscillation are arranged with their axes at equal distances on each side of the said center line and at equal distances from the center $k'$. With this arrangement the cam head $A'$ is provided with a cam groove forming a symmetrical closed or continuous curve 1, 2, 3, 4, 5 engaging with the roller $a$ and with a symmetrically shaped projecting part or tooth $n$ $n$ $n$ which alternately engages between and releases the two rollers $a'$ $a^2$. The tooth $n$ $n$ $n$ is of such form that it locks the cam head $A'$ with the lever K except when the latter is at the extreme ends of its vibrations. During the period in which the tooth is engaged between the rollers $a'$ $a^2$ the roller $a$ works in the curve 3—4—5 of the cam groove. During the period of rest or dwell of the slotted lever K the said roller works in the part 1—2 of the cam groove this part being in the form of the arc of a circle struck from the pivot $S^3$ as the center and being consequently incapable of moving the roller $a$ and lever $k$. In the intermediate positions between engagement with the tooth and the dwell of the slotted lever the axis of the roller $a$ travels in the curves 5—1 or 2—3. These portions of the curve are so formed that they produce a gradual transition of the slotted lever from the condition of rest to that of movement and vice versa. When the lever L being in the position indicated in Fig. 5 moves toward the right hand the slotted lever K remains motionless until the part 1 of the curve meets the roller $a$. Starting from this point the slotted lever K is gradually set in motion as the axis of the roller $a$ travels on the part 1—5 of the curve of the cam groove. At the same time the rollers $a'$ $a^2$ are brought into contact with opposite sides of the tooth $n$ $n$ $n$. The levers L and K are now locked together and remain in this condition moving in unison until the part 3—2 of the cam-groove or curve engages with the roller $a$ whereupon the slotted lever K is gradually brought to a standstill. The crank $k$ is adjustably fixed in a radius slot in the wheel $S^2$ which acts as a crank disk. This slot (not shown in the drawings) enables the length of the dwell of the slotted lever to be increased or diminished by correspondingly altering the throw of the crank pin.

Fig. 7 illustrates a modified arrangement of the mechanism for transmitting motion to the slotted lever K. According to this modification the two rollers $a'$ and $a^2$ are set farther apart and the part $n$ $n$ $n$ forming the tooth (Fig. 5) engaging with the said rollers is correspondingly enlarged as represented at $n'$ $n'$ $n'$ in Fig. 7. The roller $a$ and the closed cam-groove 1—2—3—4—5 are dispensed with but a curved cam surface $n^\times$ $n^\times$ $n^\times$ is arranged over the curve $n'$. During the dwell of the slotted lever and also during its gradual transition from a state of rest to a state of movement or from a state of movement to a state of rest one or the other of the rollers $a'$ $a^2$ is retained in the groove between the curved surfaces $n'$ and $n^\times$.

When the machine is in motion the crank pin working in the block sliding in the slotted cross-head $J'$, Fig. 5, imparts a regular reciprocating motion to the connecting rod J and radius links L and $L'$ which is transmitted through the cam groove and rollers Fig. 7 to the slotted lever K in such a manner that the latter is caused to move in the manner hereinbefore described in detail with reference to Fig. 5. By these means reciprocating motion is imparted to the horizontal rack S provided with a pin working in a block sliding in the slot of the slotted lever. This rack actuates the spur wheels Z and Z' gearing with the two vertical racks G which are thereby caused to reciprocate vertically in opposite directions the lengths of their strokes diminishing in proportion as the central support B is raised but without changing the level to which the said racks are elevated in each upward stroke.

We will now proceed to describe the improvements connected with the supplementary movements of the catchers including all those movements which are additional to the gradually shortening "long movement" and which serve to so regulate the positions of the pairs of gangs of catchers during the drawing of the thread as well as during the inward and outward movement of the needles in accordance with the length of the thread in such a manner that the threads are never allowed either to become too tight or too slack.

In the original machine the supplementary movement of the catchers on one side of the machine is obtained by means of a corresponding bent or bell crank lever pivotally attached to each vertical rack and receiving a vibratory motion being so arranged that the period of time between the recurrence of equal (or approximately equal) movements of the bent lever extends over two singles stitches. With this method the supplementary motion of one half of the mechanism is accordingly performed independently the supplementary motion of the other half being also separately performed. When two co-operating gangs of catchers merely describe the long movement and in consequence thereof assume at any moment an incorrect position owing for example to excessive tightness or breaking of a thread it is evidently immaterial for the rectification of the fault whether the one or the other of the gangs of catchers be raised to a certain extent or both gangs be in like manner raised to half the extent toward the original position. In other words it is immaterial whether the correcting movement be performed by either of the gangs of catchers singly or by both.

According to the method employed for producing the supplementary movement in the original machine the operation of determining the correct curves for the cam disks whence these movements were derived was attended with considerable difficulty but in the present improved form of the machine on the other hand the correcting movement of two co-operating gangs of catchers is imparted not to each gang separately but to both gangs in common and irrespectively of the consideration whether the greater part of this movement falls directly to the part of one or the other of the gangs of catchers at the time. The most convenient way to obtain this result is as hereinbefore stated by causing the central support to partake of an upward and downward motion recurring at every stitch and combined with its gradual ascending motion. When the slotted lever K is held fast in an inclined position (by a stoppage of the machine) and the central support is then raised to a certain extent the two vertical racks G ascend along with the spur wheel Z'. The horizontal rack S likewise ascending is displaced laterally owing to the inclined position of the slotted lever and thereby imparts a rotary motion to the wheels Z and Z'. This has the effect of causing the lower vertical rack to partake of a second or relative upward motion which is proportionate to the angle of inclination of the slotted lever while the higher rack for the time being also partakes of a supplementary movement of the same extent but in the opposite direction. The sum of the distances to which the two vertical racks are raised is therefore always equal to twice the distance to which the central support is elevated.

An arrangement such as that represented in Figs. 5 and 6 may be employed for producing the supplementary ascending and descending motion of the central support B forming the correcting movement. This central support or the sleeve $m'$ attached thereto is provided with a projection $v^4$ having an internal screw-thread in which works a correspondingly screwed vertical spindle or shaft S' provided at its lower extremity with a flange or collar working in a footstep bearing $f'$ (Fig. 5). A horizontal lever B' pivotally connected to the framing at $b^3$ supports this bearing at one extremity and is connected at the other extremity by a link $s'$ to a lever arm $h'$ attached to a horizontal shaft $w'$. The shaft $w'$ also carries two lever arms $h^2$ (Figs. 5 and 6) whose extremities are connected by a rod or bar $s$ parallel to the shaft $w'$ and upon which a cam roller $r$ acted upon by the periphery of a cam drum T is capable of sliding in the direction of its axis being displaced in this direction by the action of mechanism hereinafter described. The form of the cam drum is such that it may be regarded as being composed of a number of thin parallel rigidly connected cam disks whose profiles are successively modified or in other words as being so formed that by moving a plane perpendicular to the axis of the drum in the direction of this axis the lines described at the intersection of this plane by the periphery of the drum are successively modified in form. For example the line $u\ u\ u$ Fig. 5 may represent the profile at one end of the drum and $v\ v\ v$ the profile at the other end. The cam roller $r$ at the beginning of the work when the threads are long is acted on by the cam profile at one end of the drum T and as the work proceeds and the threads grow shorter is gradually shifted along the rod $s$ by the action of mechanism hereinafter described and at a rate in proportion to the consumption of thread toward the other end of the cam drum so as to be successively brought into contact with all the different sections or profiles of the cam. The gradually changing reciprocating vertical motion of the cam roller $r$ is transmitted through the lever arms $h^2 h'$, connecting link $s'$, lever B' and footstep bearing $f'$ to the vertical screw S' and central support B thereby producing in the vertical racks those movements or (when the long movement is taken into consideration) those changes of movement which we have termed the "correcting movement." The movements of the vertical racks are transmitted to the gangs of catchers by means of the connecting rods $L^2$ and parallel motion hereinafter described.

On considering the period of time that elapses before the slotted lever passes from the vertical position to the extreme inclined position represented in Fig. 5 and back again to the middle position (being a period of time equal to the time required for a single stitch) it is apparent that during this period of time the movement of the central support is always transmitted chiefly to the right hand vertical rack G while the left hand rack is influenced in a less degree by the central support. During the next period of time in which the slotted lever swings to the right hand it is on the contrary the left hand rack that is chiefly affected by the vertical displacement of the central support.

Equal or very nearly equal correcting movements for each rack and gang of catchers are required to be repeated after the lapse of a period of time equal to that required for performing two single stitches. The cam disks which produced the correcting movement in the original machine consequently rotated at the same rate or described the same number of revolutions as the crank pin $k$ producing the long movement as hereinbefore described. In the present machine equal correcting movements of each vertical rack and of the corresponding catchers also recur only after the lapse of a period of time corresponding to two single stitches. On the other hand the period of time which elapsed before the recurrence of equal (or nearly equal) movements of the central support is in accordance with the foregoing statement only half as great that is to say corresponds with a single stitch so that the cam drum T is enabled to rotate twice as fast as the driving crank $k$. It is evident that by doubling the number of revolutions of the drum a great advantage is obtained in facilitating the production of correct curves or profiles. With this doubling of the number of revolutions it is desirable (in order to obviate inaccurate movements) for the long movement to be symmetrical and free from the irregularities resulting from the employment of a vibrating connecting rod. This gives rise to the problem which is solved by the employment of the driving gear and crank with a slotted crosshead hereinbefore described as imparting motion to the slotted lever K.

In place of the toothed wheels Z Z' and racks G any other equivalent mechanical combination may be employed to produce the long movement of the thread catchers. Fig. 5$^b$ illustrates in elevation an example of such modified arrangement the same letters and figures of reference being employed to indicate the parts corresponding with those employed in the arrangement hereinbefore described. In this case the functions of the wheel Z' are performed by a lever Z'' connected by links 11 to the slides G' which actuate the thread catchers. The lever Z'' is fixed upon a rock shaft 12 provided with a lever arm $Z^{16}$ connected by a link 13 to a horizontal slide $S^{10}$ actuated by the slotted lever in the same way as the horizontal rack S hereinbefore described with reference to Figs. 5 and 6. It is evident that by means of this arrangement the same reciprocating vertical motion is transmitted to the parts G' as in the arrangement illustrated in the said Figs. 5 and 6.

The movement obtained by means of the graduated cam drum T can evidently be obtained by other equivalent mechanical combinations. Fig. 8 illustrates an example of such modified construction. In place of employing a drum T provided with successively changing profiles as represented in Figs. 5 and 6 two disks $T^3$ and $T^4$ are employed which correspond respectively with the curves $u\ u$ and $v\ v$ of the drum T. These disks impart a corresponding motion to cam rollers or equivalent devices $a^3$ whence all the intermediate degrees of motion can be produced. In the arrangement illustrated the cam rollers $a^3$ are connected by a bar $n^3$ hinged to slides $Z^3$ caused to reciprocate in fixed guides by the action of the said cam rollers. A transmitting device $r^0$ is caused to move along the bar $n^3$ in the same way as the cam roller $r$ is displaced upon the cam drum T in the other cam drum or disk combination, illustrated in Fig. 5 and is thus enabled to pass through all the intermediate movements between that derived from $T^3$ and that derived from $T^4$ corresponding to different parts of the cam drum.

*The "clearing movement."*—The clearing movement hereinbefore referred to is performed by the catchers on one side of the machine in the short interval during which the dwell of the corresponding vertical rack takes place at the end of its upward motion. The position occupied by the catchers in their highest position and above the level of the needle clamps would cause them to stand in the way of the latter when they move toward and retire from the web were the said catchers to remain in the same position while these movements take place but just before the clamps or needle holders move inward or toward the web the catchers are lowered being elevated again to their highest position immediately after the clamps have moved outward. The slotted lever being in this movement in its inclined or end position a movement of the central support B (as hereinbefore explained) can be imparted to the lower rack only but not to the higher one. Therefore it becomes necessary to obtain the clearing movement by means of mechanism that is independent of the movement of the central support. With this object an arrangement may be employed such as that illustrated in Fig. 9 (which represents the apparatus viewed from the back or more correctly speaking from the interior of the machine) and in Fig. 10. According to this arrangement each vertical rack G carries a stud $l^3$ on which works a bell crank lever $c'$ $d'$. The correcting rods $L^2$ Figs. 1 and 9 actuating the rods $N^2$ (Fig. 1) which are connected at $i^2$ with the toothed sectors and transmit motion to the gangs of catchers are not attached directly to the racks G but are connected to the arm $c'$ of the bell crank lever $c'$ $d'$ pivotally attached to the said racks. During the downward motion, the dwell at the bottom of the stroke and the upward motion of each rack G it is rigidly connected to the bell crank lever $c'$ $d'$ which is locked or prevented from turning on its center during this period but during the dwell of the mechanism which takes place when the rack is in its highest position this rigid connection is released and the bell-crank lever $c'$ $d'$ is made free to oscillate upon its center and thus enables the clearing movement to be performed. A locking disk $v'$ is carried on a stud $z'$ attached to each rack G the said disk being composed of a circular plate provided with an annular rim $r'$ and $r^{\times}$ the greater part of which is cut away as represented in Fig. 9. A projection $d°$ on the lever arm $d'$ engages with the inner surface of this rim. A vertical guide rail $f^2$, attached to the machine frame and bent at right angles at its upper extremity engages with the recess formed between two portions $r'$ and $r^{\times}$ of the rim of the locking disk in such a manner that the latter is prevented from rotating on its center in all the intermediate and lower positions of the rack G and is retained in the position in which it locks the bell-crank lever $c'$ $d'$ by holding it against a projection or stop $d^{\times}$. When the rack ascends and has assumed its highest position the locking disk in passing over the horizontal bent portion of the guide rail receives a certain amount of rotary motion which causes it to release the bell-crank lever $c'$ $d'$. A horizontal rod F sliding in guides carries two forks $m^2$ and $m^3$ having their open ends directed downward. At the moment when one of the vertical racks approaches its highest position the rod F is placed in such a position that a pin $d^6$ (which may be provided with a roller) on the corresponding bell crank lever arm $d'$ is caused to pass between the legs of the corresponding fork as represented on the right hand of Fig. 9. The rod F then describes a movement in the direction of its axis thereby acting on the bell-crank lever $c'$ $d'$ (which is released at this moment by the action of the locking device hereinbefore described) and moving it in the direction indicated by the arrows in the drawings so as to cause the corresponding row or gang of catchers to be depressed in the manner required for the clearing movement. After the needle clamps have moved up to the web and retired the rod F returns and restores the bell-crank lever $c'$ $d'$ and the corresponding gang of catchers to their original positions. Immediately upon or before the escape of the pin $d^6$ from the fork the arm $d'$ of the corresponding bell-crank lever is engaged by the locking disk and retained in one position during the period of the descent and ascent of the rack. The reciprocating motion of the rod F is obtained by means of a vertical shaft $O^2$, Figs. 6 and 10, carrying two lever arms $J^2$ and $M^2$ and two connecting rods $Q^2$ and $T^2$ the rod $Q^2$ being connected to a sliding block $U^2$ provided with two rollers $u^3$ acted on by a rotating cam $V^2$ by which the requisite reciprocating motion is imparted to the slide $U^2$ and parts connected therewith. The cam $V^2$ working between the rollers $u^3$ on the slide $U^2$ as shown more clearly in Fig. 10 is of such a shape as to enable it to impart to the rod F a regular or symmetrical reciprocating movement with a dwell at each end of the stroke. According to the arrangement illustrated in the drawings the cam disk has to describe three half revolutions during one change or passage of the needles. Two successive to and fro movements of the rod F are utilized in obtaining the clearing movement of the catchers every third movement of the said rod being without effect. During the period occupied by the movement to the left, dwell, and movement to the right the bell crank lever $c'$ $d'$ on the right hand for example engages by means of its pin $d^6$ with the fork $m^3$ as represented in Fig. 9 and receives therefrom the motion necessary to produce the clearing movement of the corresponding gang of catchers. In this case the ensuing movement to the left of the rod F produces no effect upon the bell crank lever $c'$ $d'$ as this movement to the left takes place at a time when both of the vertical racks are in motion and both of the two bell-crank levers $c'$ $d'$ are out of reach of the forks $m^2$, $m^3$. The movement to the left brings the fork $m^2$ into position for engaging later on with the pin on the left hand bell crank lever $c'$ $d'$ which is thereafter engaged by and moves with the said fork during the movement to the right dwell and movement to the left.

The automatic shortening of the "long movement" of the catchers according to the consumption of thread is effected by means of a regulating apparatus which at each stitch imparts a small rotary motion to the screwed shaft $S'$ (Fig. 5) and thereby intermittently and gradually elevates the central support relatively to the footstep bearing $f'$. A suitable construction of mechanism for accomplishing this is illustrated in elevation in Fig. 11 and in plan partly in horizontal section in Fig. 12 of the accompanying drawings. The screwed shaft S' is connected by a sliding coupling (such as a prismatical bar U' sliding in a corresponding sleeve or socket V', Figs. 5 and 5$^d$) to a short shaft $w$ (Figs. 5 and 11) in such a manner that the latter is enabled to rotate with the said screw shaft without partaking of its vertical or axial movements. On the short shaft $w$ there is fixed a ratchet wheel X (Figs. 11 and 12) capable of receiving an intermittent rotary motion from a regulating pawl $d$ being prevented from returning by means of a retaining pawl $e$. According to the form of construction represented in the drawings the regulating pawl $d$ is pivotally attached to a regulating lever D illustrated separately in Figs. 16 and 17 carried by a boss or sleeve $O^4$ loose upon the shaft $w$ underneath the ratchet wheel X. The said lever D is connected with a curved arm $b$, Fig. 17, provided with a regulating tooth $i$ capable of engaging with a second regulating pawl $c$. Another regulating lever marked C' (Figs. 14 and 15) to which this pawl $c$ is pivotally attached is carried by a loose boss or sleeve $O^5$ placed upon the shaft $w$ above the ratchet wheel X. Upon a regularly or continuously rotating vertical shaft X' describing one revolution to every single (right or left-handed) stitch there is a crank $K^2$ which by means of a connecting rod $P^2$ and a short lever arm $c^2$ causes the upper regulating lever C' to describe a rocking or vibratory motion upon the shaft $w$. A spring $g^x$ tends to push the second regulating pawl ($c$) outward that is to say out of gear or engagement with the tooth $i$. On the other hand the regulating pawl $c$ is capable of being temporarily prevented by the action of a small locking device from becoming released by or disengaged from the tooth $i$. This locking device consists of a light lever $m$ (Figs. 13, 14 and 15) placed on the pin or spindle $n^6$ of the regulating pawl $c$ and provided with a tooth $e^2$ capable of being engaged by a small catch or hook $q$ in such a manner as to enable the said catch to prevent the lever $m$ from moving outward and releasing the regulating pawl $c$. The small catch or hook $q$ working on a long pin $n^4$ (Fig. 14) inserted in a bearing or hole drilled in the end of the short shaft $w$ is connected with a lever arm $e^4$ carrying a long pin $l'$. When the upper regulating arm C' moves in a direction opposite to that indicated by the arrow in Fig. 12, the eye $d^2$ on the said arm C' (Figs. 12 and 17) comes in contact with a projection $e^0$ connected with the lower regulating arm D and causes the latter to move with it. Shortly before the end of this movement an outwardly projecting arm $b^2$ on the pawl $c$ comes in contact with the end of an adjustable stop or set screw $c^3$ which has the effect of causing the first regulating pawl $c$ which was previously out of engagement with the tooth $i$ to rotate upon its center into such a position that it (the pawl) can act upon the tooth $i$ and that the lever $m$ is locked by the small hook or catch $q$. The second stop or set screw ($d^3$) serves merely to stop the lower regulating lever D in case it should be accidentally thrown over too far. When the upper regulating arm or lever C' commences to move in the direction of the arrow the pawl $c$ which has been drawn inward and locked by the hook $q$ engages after moving a short distance with the tooth $i$ and thereupon imparts motion to the lower regulating arm D. The latter then by means of the first regulating pawl $d$ engaging with the teeth of the ratchet wheel X produces a corresponding rotary motion of the said wheel. The rotary motion thus imparted to the ratchet wheel and to the screwed shaft S' continues until the hook $q$ is disengaged (by means of the devices next hereinafter described) from or caused to release the lever $m$. Directly this takes place the second regulating pawl $c$ is caused to slip off the face of the tooth $i$ by the action of the pressure exerted by a spring $g^x$ upon the lever $m$, and from that moment the lower regulating lever D and ratchet wheel X remain stationary.

It now remains to provide for producing the release of the locking lever $m$ by the hook $q$ and to so regulate this release that the width of the angle through which the ratchet wheel X and screwed shaft S' are moved at each single stitch shall be as nearly as possible proportional to the consumption of thread. With this object the following arrangement may be employed: Two horizontal parallel shafts A $A^0$, Figs. 11 and 12, operated respectively by the tension device on opposite sides of the web as hereinafter explained with reference to Figs. 19 and 20 are provided at their free extremities with small lever arms H and $H^0$ by means of which they are enabled to impart reciprocating movements to two approximately horizontal and parallel rods Q and $Q^0$. These rods slide in two holes formed in a small plate $p$ acting as a guide and situated at some distance from the arms H and $H^0$ being attached to a vertical rod $x'$ capable of partaking of a reciprocating vertical motion in suitable guides. This movement is transmitted to the rod $x'$ by means of a cam disk $Z^4$, Fig. 11, on the shaft X' and a two-armed lever $k^2$ provided with a roller. An eye or socket $u^3$ on an overhanging arm Y forms a bearing and also acts as a brake for the center conical pin or pivot $n^2$ of a two-armed lever $N^3$. The brake action or resistance can be regulated by adjusting a spring $t^2$ which tends to tighten the taper pivot $n^2$ in the conical socket $u^2$. The two-armed lever $N^3$ whose geometrical axis is centrally arranged between the rods Q $Q^0$ carries two downwardly directed pins $n$ and $n^0$. So long as the guide plate $p$ remains in its lowest position two fingers O $O^0$, Figs. 11, 12 and 13 on the rods Q and $Q^0$ are enabled to pass under the pins $n$ and $n^0$ without touching them but when the said guide plate is elevated these fingers come in contact with the said pins and cause the lever $N^3$ to turn upon its pivot. Shortly before one of the two tension devices makes the out stroke employed for measuring or gaging the length of thread used in the last stitch, the guide plate $p$ is elevated into its highest position so that the rod Q or $Q^0$ being displaced by the corresponding tension device in the direction of the arrow, Fig. 13, brings its finger to bear upon the two-armed lever $N^3$ and causes the latter to rotate to an extent dependent on the angle through which the tension device has been moved. Owing to the brake action or friction of the coned pivot the two armed lever $N^3$ remains for a certain time in the position in which it has been placed by this movement. At about the same time at which the adjusting or circular motion of the two armed lever $N^3$ ends the upper regulating lever $C'$ commences its rotation or movement in the direction of the arrow in Fig. 12 the small catch or hook $q$ being caused to partake of this motion by the action of a spring $t^3$ (Fig. 12). The long pin $l'$ (Fig. 11) connected to the hook $q$ is brought by this movement into contact with an extension or arm $O^2$ on the stationary two-armed lever $N^3$ (Figs. 12 and 13) and the hook $q$ is thereby caused to release the lever $m$. In this operation the disengagement of the hook $q$ requires to take place earlier and the rotation of the ratchet wheel X and screwed shaft $S'$ must cease earlier in proportion as the two armed lever $N^3$ is pushed farther by the finger O or $O^0$ that acts upon it at the time or in other words the angle through which the screwed shaft $S'$ is caused to rotate becomes smaller in proportion as the outstroke of the tension device acting on the finger O or $O^0$ becomes longer. The outstroke of the tension device worked by the action of a spring is limited by the threads which it tends to stretch so that a long stroke represents a small consumption and a short stroke a large consumption of thread. The degree or angle through which the screwed shaft $s'$ is rotated consequently becomes greater or smaller in accordance with the amount of thread that is used in each stitch. The axis of the two-armed lever $N^3$ may be outside of (eccentric to) the axis of the small hook $q$ and the arrangement of the parts $q$ $e^4$ and $N^3$, Fig. 13, may be so contrived that so long as the pin $l'$ remains in contact with the arm or extension $o^2$ the relation between the two levers $e^4$ and $N^3$ is about one to two. The fingers O and $O^0$ are further so arranged that when the consumption of the thread in one stitch is practically naught or zero the disengagement of the hook $q$ takes place precisely at the moment when the driving pawl $c$ reaches the tooth $i$. A very true proportion between the measured consumption of thread and the degree of rotation of the screwed shaft is thus obtained. Directly the hook $q$ is disengaged the lever $m$ flies outward under the pressure of the spring $g^x$ until stopped by a projection $l^2$, Figs. 12 and 15. This same projection also meets the back of the hook $q$ and pushes the latter in front of it to the end of the stroke. The long pin $l'$ overcoming the resistance of the brake action transmits this movement also to the two-armed lever $N^3$ which is thereby returned to the position in which the fingers O and $O^0$ are able to act upon it. For gaging the consumption of thread in the original machine that outstroke of the tension device was utilized which was employed for pulling tight the stitches just before the instroke of the needles and which (on account of the different degrees of tension in the stitches required for different parts of the pattern) takes place under variable spring pressure. Experience has now shown that certain kinds of yarn are liable to stretch or elongate considerably and that certain kinds of web or fabric are liable to bulge considerably out of the central plane, thus seriously interfering with the method of performing the measurement and rendering it inaccurate. In the present machine on the other hand the outstroke of the tension device that takes place under invariable tension of the thread just after the outward stroke of the needles and serving to insure the engagement of the catchers is utilized for gaging the thread so that the aforesaid serious errors are obviated. Referring to Figs. 19 and 20, the lower tension shafts $e^{21}$ $e^{22}$, caused to move in unison with the upper shafts $e^{21}$, $e^{22}$ by means of connecting rods $H^{22}$ are provided with pendent lever arms $r^{24}$ connected by rods $r^{25}$ to levers $Y^{24}$ and $X^{24}$ which by the action of a spring $F^{20}$ are retained in contact with the periphery of a cam $P^{22}$ rotating continuously with and alongside of a second smaller rotating cam $O^{22}$. Suitable springs such as torsion rods $L^{22}$ $L^{23}$ extending from one side of the machine to the other are employed to press two short pulling or supplementary levers $x^{23}$ $y^{23}$ against the periphery of the second cam $O^{22}$. The cam $P^{22}$ is provided with two depressions at $u^{24}$ and $v^{24}$ and the cam $O^{22}$ has but one depression at $w^{24}$ being in the same radius as the depression $u^{24}$ in the first cam. In connection with the levers $x^{23}$ and $y^{23}$ there are projections $t^{24}$, $t^{24}$, carrying set screws which are situated in the same plane as the long levers $Y^{24}$ $X^{24}$. It is evident that when the small or shallow depression $v^{24}$ in the large cam $P^{22}$ acts on the anti-friction roller on either of the levers $Y^{24}$ or $X^{24}$ only the lever that is opposite to the depression yields to the action of the spring and moves so as to cause the tension bar or rail to act upon the thread. This action takes place at the commencement of a stitch. On the other hand when both of the large depressions $w^{24}$ and $u^{24}$ in the two cams coincide with the rollers on two corresponding levers, $Y^{24}$, $x^{23}$, or $X^{24}$ $y^{23}$, the lever $x^{23}$, or $y^{23}$, as well as the lever $Y^{24}$ or $X^{24}$ is likewise acted on by the strong spring $L^{22}$ or $L^{23}$. In this case two springs acting in concert act with their combined or accumulated force upon the lever $Y^{24}$ or $X^{24}$ and cause the corresponding tension bar $d^{21}$ or $d^{22}$ to act upon the thread. The force exerted by the combined operation of the springs being regulated by hand as the work proceeds is evidently to be only sufficient to draw the stitches tight without injuring the threads. Shortly after the commencement of the stitch the tension rail on the opposite side to the needles comes into operation with a weak spring pressure; shortly before the completion of the stitch the tension rail upon the same side as the needles makes a second stroke with a stronger spring pressure. In a machine with several superposed series of needles all the left or right hand tension rails in the machine corresponding to the several series of needles act in the same manner. The levers 7, 7, fixed upon the upper tension shafts $e^{21} e^{22}$ are connected by links 8, 8 to the levers 9, 9 fixed upon the shafts A, $A^0$ so that each of the shafts A $A^0$ is driven by a tension shaft $e^{21}$ or $e^{22}$ and partakes of all its movements. The employment of this second later outstroke of the tension device gives rise however to two new requirements which have to be combined with the shortening mechanism. In the first place owing to the late period at which the gaging takes place the rotary motion of the screwed shaft has to follow as quickly as possible after the gaging and secondly arrangements must be made for preventing the first or earlier and generally longer outstroke of the tension device from acting on the shortening or regulating apparatus or mechanism (rotation of the screwed shaft). In order to comply with the first requirement the regulating mechanism described acting at the beginning of the regulating stroke is employed. The second requirement is complied with by providing the disconnecting device which raises and lowers the fingers O and O°.

In order to cause the roller $r$ or its equivalent employed in the cam disk combination hereinbefore described in connection with the correcting movement to be gradually displaced or moved from one end of the cam drum T to the other during the progress of the work, the arrangement next hereinafter described may be employed. The movement of the ratchet wheel X is transmitted through two conical wheels $C^2 D^2$, Figs. 5 and 11, to a horizontal screwed shaft $a^5$, Figs. 5 and 12, working in stationary bearings. The shaft in rotating gradually propels a nut E' which is prevented from rotating by a sliding block $E^2$. The movement of the nut is transmitted from this sliding block by means of a lever $F^2$ and a shaft O' to a forked lever M'. The latter is provided with two eyes through which passes a round rod Y' capable of vertical motion and provided at its lower end with a flat hook $x^2$ which engages with a groove in a sleeve connected to the roller $r$ (Figs. 5 and 6) and moves the latter from one end of the cam drum T to the other as the work proceeds.

The crank handle T', Figs. 5 and 12 is provided for the purpose of rotating the screwed shafts $a^5$ and $s'$ by hand in order to enable the central support B to be returned to its lowest position after the work is completed.

Without any other alteration in the working of the machine the parts may be so arranged that the roller $r$ remains stationary in an axial direction, that is to say has no lateral or axial motion and the cam drum T partakes of a gradual displacement in the direction of its axis. An arrangement of this description is illustrated in plan in Fig. 6ª in which the same letters and figures of reference are used to indicate corresponding parts. In this case the drum T slides upon the shaft $L^3$ which is provided with feathers so as to cause the drum to partake of the rotary motion of the shaft and at the same time is capable of sliding thereon in the direction of its axis. The drum is connected to a sleeve $T^x$ provided with a groove $t^x$ in which works a block carried by a pin attached to a lever arm $y^x$ fixed on the vertical shaft O'. This vertical shaft being operated in the manner hereinbefore described causes the drum T to be displaced relatively to the roller or touching device $r$ thus producing the same effect as is obtained by means of the arrangement hereinbefore described with reference to Fig. 6.

In order to render clearly intelligible the claims setting forth the general features which constitute the essence of the invention the following definitions are given of certain terms which are employed in the claims: "Controlling devices" are those parts which co-operate to produce both the "long movement" and the "correcting movement" being referred to in the body of the specification as vertical toothed racks but which may be worked with equal advantage by means of a suitable combination of levers in place of by the spur wheel Z' in which case they would not be in the form of toothed racks.

"Catcher driving device" is a term applied to that part of the machine which participates in the motion of both controlling devices which it drives, the said catcher driving device being described in the body of the specification as a spur wheel Z' on a shaft $Z^0$ although the said catcher driving devices may with equal advantage be replaced by other mechanical parts such for example as a two-armed lever with a shaft connected thereto.

The term "cam disk-combination" is hereinafter employed to designate an arrangement in which the correction movement is produced by two cam disks and wherein the movements produced by two parts (such as $a^3$) are combined by an intermediate member (such as $n^3$) as hereinbefore explained with reference to Fig. 8 for example.

The part which directly receives the motion from the cam drum or the combined motion from the cam disks is termed "touching device."

"Driving cam" is employed indifferently to indicate either the cam drum or the cam disk combination.

The "shortening device" is that part of the machine which directly receives the gradual or step by step advancing motion employed for shortening the amplitude of the long movement; the ratchet wheel X, Figs. 11 and 12 for example may be employed for producing this motion.

We claim as our invention—

1. The combination of a rock shaft, a number of arms $P^\times$ fixed to the said shaft, and a second shaft N' having its bearing in the said arms $P^\times$, with arms $D^\times$ carrying the catcher bars, and pivoted to the said arms $P^\times$ and intermediate connections between the said arms $D^\times$ and the said shaft N', all substantially as and for the purposes set forth.

2. The combination of a rock shaft provided with arms P $P^\times$ fixed thereto, and a second shaft N' having its bearings in the said arms P $P^\times$ and provided with spur wheels, with a link D' pivoted to the arm P, arms $D^\times$ carrying the catcher bars, and pivoted to the said arms $P^\times$ the said link D' and arms $D^\times$ each provided with a rack segment gearing with the said spur-wheels on the shaft N', all substantially as and for the purposes set forth.

3. The combination of a rock shaft, an arm $P^\times$ fixed thereto, a spur-wheel $p^\times$ having the bearings for its shaft in the said arm $P^\times$, with an arm $D^\times$ carrying the catcher bar $G^2$, the said arm $D^\times$ being pivoted to the said arm $P^\times$ and provided with a rack segment $M^\times$ gearing with the said spur-wheel, and a beam or bearer E provided with an opening for the passage of the said rack-segment, all substantially as and for the purposes set forth.

4. The combination of the thread catchers, a slotted lever K and connections between the lever K and the said thread catchers, with a lever L provided with cam surfaces to act upon the said lever K and impart thereto a vibratory motion with a dwell at each end, and a reciprocating bar J connected to the lever L and having a slotted cross-head J' an adjustable revolving crank $k$ and a lever L to give a parallel ruler motion, all substantially as set forth.

5. The combination of the thread catchers, the slotted lever K provided with rollers $a$, $a'$ and $a^2$ and connections between the said lever K and the said thread catchers, with the reciprocating lever L having a head provided with a locking tooth adapted to engage between the rollers $a'$, $a^2$ the said head also provided with a cam groove 1, 2, 3, 4, 5 in which the roller $a$ works to give to the lever K a vibratory motion with a dwell at each end, substantially as and for the purpose set forth.

6. The combination of the thread catchers, the catcher driving device and its controlling devices, with means for producing a clearing movement of the catchers, the said means consisting of a bell crank connection between the catchers and their controlling devices, a locking device to lock the said bell crank rigid with the controlling devices during the drawing of the threads and adapted to release it at the proper time, and devices for turning the bell crank lever when released independently of the controlling devices all substantially as set forth.

7. The combination, with the thread catchers, the catcher driving device and means for automatically shortening the "long movement" thereof in proportion to the gradual shortening of the thread, of a driving cam (T) and connections whereby the said catcher driving device is given an additional and gradually changing reciprocating motion as and for the purpose set forth.

8. The combination of the catcher driving device and means for automatically shortening the movement thereof in proportion to the gradual shortening of the thread, with a cam drum T whose surface presents gradually changing profiles from one end of the drum to the other end thereof, a touching device brought successively in contact with the said changing profiles in proportion to the said shortening movement of the said driving device and connections between the touching device and catcher driving device, all substantially as and for the purpose set forth.

9. The combination of the catchers, tension device and intermediate mechanism with a ratchet, a regulating pawl and a catch holding the said regulating pawl in engagement with the ratchet at the beginning of its effective movement and releasing it earlier or later in accordance with the consumption of thread as set forth.

10. The combination of the catchers, the tension device the shortening device and means such as rods Q and $Q^0$ which are alternately placed in and out of contact with the catch of the regulating pawl enabling that outstroke of the tension device which takes place under unvarying spring pressure to be utilized to produce the shortening of the long movement.

11. The combination of the catcher bars, the catcher driving device and the controlling devices for producing the long movement of the catcher bars, the shortening device and means (such as a screw and a nut for example) for producing a progressive movement of the catcher driving device in proportion to the gradual shortening of the thread whereby the said device imparts a proportionally diminishing length of stroke to the catcher bars substantially as set forth.

12. The combination of the thread catchers a support B carrying the gear wheel Z' and provided with a nut $v^4$ means for rotating the said gear wheel, gearing with racks G connected with the thread catchers with a screw S' working in the nut $v^4$ and means for rotating the said screw in proportion to the gradual shortening of the thread all substantially as and for the purposes set forth.

13. The combination of thread catchers, driving device, a driving cam T, a touching device and connections between the said touching device and the driving device, with means for automatically shortening the movement of the controlling devices and at the same time gradually changing the position of the said touching device relatively to the said driving cam in the direction of the axis of the driving cam in proportion to the consumption of thread at each stitch all substantially as set forth.

14. The combination of the thread catchers, the driving device provided with a screw S' with a cam drum touching device and suitable lever connections whereby the motion of the said touching device is changed into a to-and-fro axial movement of the said screw, all substantially in the manner and for the purposes set forth.

15. The combination of the thread catchers, controlling devices and intermediate connection adapted to be rigidly locked to the said controlling devices but released at the proper time, with a reciprocating rod provided with forks, which engage with the released intermediate connection to produce the clearing movement, all substantially as set forth.

16. The combination of the thread catchers and controlling devices having a rod F to produce the clearing movement of the catchers with a cam disk describing one and a half revolution to a single stitch and suitable intermediate connections to transmit the movement of the said cam to the said rod.

17. The combination of the thread catchers, controlling devices and intermediate connections with a locking disk $v'$ to lock the said connections with the controlling device and a guide rail $f^2$ for the said disk, the said rail $f^2$ being bent at an angle at its upper part to produce the rotation of the locking disk to release the said connections, all substantially as and for the purposes set forth.

18. The combination of the thread catchers, driving devices and a screw S' to control by its rotation the length of movement of the controlling devices, with pawl and ratchet devices to rotate the screw and disengaging devices controlled by the varying outstroke of the tension device, substantially as and for the purposes set forth.

19. The combination of the thread catchers the shortening device and tension device with a ratchet provided with a regulating pawl $c$ actuated by a stop $c^3$ a spring $g^\times$ and a catch $q$ with a tooth $i$ to cause the said pawl to automatically escape from the said tooth at periods of the stroke of the tension devices after each stitch varying in proportion to the amount of thread consumed at each stitch, all substantially as described.

In testimony whereof we have signed our names to this specification in the presence of two subscribing witnesses.

EDWARD BUSS.
ADOLPH SAURER.

Witnesses:
HUBER ZOLLIKOFER,
*Of Arbon,*
JOSEPH SIMON,
*St. Gallen.*